US006266167B1

(12) United States Patent
Klug et al.

(10) Patent No.: US 6,266,167 B1
(45) Date of Patent: Jul. 24, 2001

(54) APPARATUS AND METHOD FOR REPLICATING A HOLOGRAM USING A STEERABLE BEAM

(75) Inventors: Michael Anthony Klug; Mark E. Holzbach; Alejandro José Ferdman, all of Austin, TX (US)

(73) Assignee: Zebra Imaging, Inc., Pflugerville, TX (US)

( * ) Notice: Subject to any disclaimer, the term of this patent is extended or adjusted under 35 U.S.C. 154(b) by 0 days.

(21) Appl. No.: 09/195,137

(22) Filed: Nov. 18, 1998

Related U.S. Application Data

(63) Continuation-in-part of application No. 09/098,581, filed on Jun. 17, 1998.
(60) Provisional application No. 60/076,237, filed on Feb. 27, 1998.

(51) Int. Cl.[7] ........................................ G03H 1/20
(52) U.S. Cl. ............................ 359/12; 359/22; 359/23; 359/34; 359/35
(58) Field of Search .................. 359/12, 22, 23, 359/34, 35

(56) References Cited

U.S. PATENT DOCUMENTS

| 3,658,402 | 4/1972 | Nishida et al. ................ 350/3.5 |
| 3,758,186 | 9/1973 | Brumm ........................... 350/3.5 |

(List continued on next page.)

FOREIGN PATENT DOCUMENTS

| 2214651A | 9/1989 | (GB) | ............................ G03H/1/26 |
| 10020747 | 1/1998 | (JP) | ............................ G03H/1/04 |
| 10020752 | 1/1998 | (JP) | ............................ G03H/1/22 |
| 10020754 | 1/1998 | (JP) | ............................ G03H/1/26 |
| 10020755 | 1/1998 | (JP) | ............................ G03H/1/26 |
| 10020756 | 1/1998 | (JP) | ............................ G03H/1/26 |
| 10026924 | 1/1998 | (JP) | ............................ G03H/1/26 |

OTHER PUBLICATIONS

Laser Scan System, *Melles Griot Catalog*, 18, 2–6, 1995/96.
D.F. Tipton, "New Hologram Replicator for Volume Holograms and Holographic Optical Elements," IS&T/SPIE Symposim on Electronic Imaging: Science and Technology, Jan. 1998.
International Search Report, dated Oct. 27, 1999, for PCT/US99/13919.
International Search Report, dated Oct. 27, 1999, for PCT/US99/14006.
Copending U.S. application No. 09/098581 entitled Method and Apparatus for Recording One–Step, Full–Color, Full–Parallax, Holographic Stereograms, filed Jun. 17, 1998.
Copending U.S. application No. 09/151,330 entitled System and Method for Hologram Illumination, filed Sep. 11, 1998.

(List continued on next page.)

*Primary Examiner*—Cassandra Spyrou
*Assistant Examiner*—Craig Curtis
(74) *Attorney, Agent, or Firm*—Skjerven Morrill MacPherson LLP

(57) ABSTRACT

An apparatus and method are disclosed for replicating a hologram. The apparatus comprises an assembly operable to position a hologram in proximity to holographic recording material. The apparatus further comprises a beam steering unit operable to direct a beam at component portions of the hologram to replicate the component portions onto a holographic recording material. The beam steering unit is further operable to enable independently variable angles of incidence at which the beam strikes each component portion.

59 Claims, 29 Drawing Sheets

U.S. PATENT DOCUMENTS

| | | | |
|---|---|---|---|
| 3,832,027 | 8/1974 | King | 350/3.5 |
| 4,043,653 | 8/1977 | Corce et al. | 355/2 |
| 4,067,638 | 1/1978 | Yano et al. | 350/3.5 |
| 4,206,965 | 6/1980 | McGrew | 350/3.76 |
| 4,353,616 * | 10/1982 | Leclerc et al. | 359/12 |
| 4,364,627 | 12/1982 | Haines | 350/3.76 |
| 4,411,489 | 10/1983 | McGrew | 350/3.76 |
| 4,416,540 | 11/1983 | Nicholson | 350/3.69 |
| 4,445,749 | 5/1984 | Benton | 350/376 |
| 4,498,740 | 2/1985 | Caulfield | 350/3.66 |
| 4,715,694 | 12/1987 | Eitel | 350/486 |
| 4,778,262 | 10/1988 | Haines | 350/3.66 |
| 4,834,476 | 5/1989 | Benton | 350/3.76 |
| 4,895,419 | 1/1990 | Doyle et al. | 350/3.69 |
| 4,915,464 * | 4/1990 | Hopwood | 359/12 |
| 4,944,580 | 7/1990 | MacDonald et al. | 350/611 |
| 4,969,700 | 11/1990 | Haines | 350/3.66 |
| 4,995,685 | 2/1991 | Armstrong et al. | 350/3.65 |
| 5,138,471 | 8/1992 | McGrew | 359/21 |
| 5,191,449 | 3/1993 | Newswanger | 359/22 |
| 5,194,971 | 3/1993 | Haines | 359/9 |
| 5,237,433 | 8/1993 | Haines | 359/9 |
| 5,486,933 | 1/1996 | Shindo et al. | 359/2 |
| 5,499,118 | 3/1996 | Wreede et al. | 359/12 |
| 5,504,593 | 4/1996 | Hotta et al. | 359/1 |
| 5,543,251 * | 8/1996 | Taylor | 430/1 |
| 5,570,208 | 10/1996 | Kato et al. | 359/23 |
| 5,724,161 | 3/1998 | Smith et al. | 359/13 |
| 5,734,485 | 3/1998 | Buchkremer et al. | 359/25 |
| 5,825,540 | 10/1998 | Gold et al. | 359/23 |

OTHER PUBLICATIONS

K. Okada, T. Honda and J. Tsujiuchi, "A Method of Distortion Compensation of Multiplex Holograms," *Optics Communications,* vol. 48, No. 3, Dec. 1983.

Michael W. Halle, Stephen A. Benton, Michael A. Klug, John S. Underkoffler, "The Ultragram: A Generalized Holographic Sterogram," to appear in *Practical Holography V,* SPIE, 1991.

Michael A. Klug, Michael W. Halle, Mark Lucente, Wendy J. Plesniak, "A Compact Prototype One–Step Ultragram Printer," to appear in *Practical Holography VII: Imaging and Materials,* SPIE, 1993.

Michael A. Klug, Michael W. Halle, Paul M. Hubel, "Full Color Ultragrams," to appear in *Practical Holography VI,* SPIE, 1992.

M. Yamaguchi, H. Endoh, T. Honda, H. Ohyama, "High–Quality Recording of a Full–Parallax–Holographic Steroegram with a Digital Diffuser," *Optics Letters,* vol. 19, pp. 135–137, Jan. 1994.

M. Yamaguchi, T. Koyama, H. Endoh, N. Ohyama, S. Takahashi, and F. Iwata, "Development of a Prototype Full–Parallax Holoprinter."

Michael W. Halle and Adam B. Kropp, "Fast Computer Graphics Rendering for Full Parallax Spatial Displays," SPIE vol. 3011, pp. 105–112, 1997.

"Scanning Lens Theory," *Special Optics,* 36–37, 1998.

* cited by examiner

APPARATUS AND METHOD FOR REPLICATING A HOLOGRAM USING A STEERABLE BEAM

CROSS-REFERENCE TO RELATED APPLICATIONS

This application is a continuation-in-part of U.S. patent application Ser. No. 09/098,581 filed Jun. 17, 1998 by Klug, et al, and entitled "Method and Apparatus for Recording One-Step, Full-Color, Full-Parallax, Holographic Stereograms", pending, which claims priority to U.S. Provisional Application 60/076,237, filed Feb, 27, 1998, pending.

TECHNICAL FIELD OF THE INVENTION

The present invention relates in general to the field of holography and, more particularly, to an apparatus and method for replicating a hologram using a steerable beam.

BACKGROUND OF THE INVENTION

The present invention relates generally to the field of holography. More particularly, it concerns methods and devices for creating, replicating, and printing variable size and variable resolution holographic stereograms, holograms, and holographic optical elements using computer rendered images of three-dimensional computer models or using computer processed images.

A holographic stereogram is a type of hologram synthesized or composed from a set of two-dimensional views of a subject. A holographic stereogram is capable of creating the convincing illusion of a solid three-dimensional subject from closely spaced, discrete-perspective, two-dimensional component views. In addition, if the two-dimensional component views are properly generated, a holographic stereogram can also create the illusion of an animated image. Although holographic stereograms can project such special effects, due to limitations in the methods and techniques for printing holographic stereograms, holographic stereograms have generally been expensive, difficult, and time consuming to produce.

Techniques have been developed for reducing the number of steps involved in producing holographic stereograms to one optical printing step. One-step technology usually involves using computer processed images of objects or computer models of objects to build a hologram from a number of contiguous, small, elemental pieces, known as elemental holograms or hogels. This one-step technology eliminates the need to create a preliminary hologram.

To produce a full-parallax, holographic stereogram using traditional one-step technology, a three-dimensional computer model of an object or a scene is created. There are numerous computer graphic modeling programs, rendering programs, animation programs, three dimensional digitalization systems, or combinations of the programs or systems that can be used to generate and manipulate a three-dimensional computer model of an object or a scene. Examples of such programs or systems include, but are not limited to, computer-aided-design (CAD) programs, scientific visualization programs, and virtual reality programs.

In addition, to produce a holographic stereogram using one-step technology requires that the position of the hologram surface and individual elemental holograms relative to an object or a scene be determined. Furthermore, a proper computer graphic camera(s)'s description for an elemental hologram and the size and location of a spatial light modulator (SLM), a device that can display a two-dimensional image, need to be determined.

Once all the aforementioned initial parameters are determined, a two-dimensional projection on the SLM for each elemental hologram is computed based on the computer graphic model of the object or scene that was created, the positions of the elemental holograms, and the computer graphic camera's description for the elemental holograms The two-dimensional projection on the SLM for each elemental hologram may be rendered using various computer graphic techniques. The process of creating two-dimensional views from a three-dimensional object and adding qualities such as variations in color and shade to a computer graphic model is often referred to as rendering. There are numerous methods for rendering. One method is ray-tracing, which computes images by accurately simulating sampled light rays in a computer model. Another method is scan-line conversion, which computes images one raster or line at a time. Typically scan-line rendering does not produce as realistic results as ray tracing. However, scan-line rendering is frequently used in animation packages because it is faster. Another method for using computer graphics to render images for one-step, full-parallax holographic stereograms is described in an article by Halle and Kropp. Halle, M. and Kropp, A., "Fast Computer Graphics Rendering for Full Parallax Spatial Displays," *Proc. Soc. Photo-Opt. Instrum. Eng.* (SPIE), 3011:105–112 (Feb. 10–11, 1997), the disclosure of which is incorporated herein by reference.

When holographic stereograms are produced by either the multi-step or one-step techniques, the reconstructed images may have geometric image distortions. These geometric image distortions may be very apparent, especially in large, billboard size holographic displays or holographic displays in other geometries, such as an alcove or a partial cylinder.

One solution that has been incorporated into multi-step techniques to correct for geometric image distortions for multiplex holograms is discussed in an article by Okada. Okada, K., et. al., "A Method of Distortion Compensation of Multiplex Holograms," *Optics Communications*, vol. 48, no. 3, pp. 167–170 (Dec. 1, 1983), the disclosure of which is incorporated herein by reference. The technique discussed in Okada's article to correct distortion is a method to correct geometrical and time distortion of a single or monocular viewpoint of a finished hologram. Because it is a post-processing method that takes place after image acquisition, Okada's technique would be inefficient if adopted to generate animated computer graphics for one-step, holographic stereograms. Moreover, Okada's method only produces horizontal-parallax-only transmission type holograms.

Others have developed techniques for pre-distorting one-step, holographic stereograms to reduce distortion in the final holographic display. One such pre-distortion technique is described in a paper by Halle and others. Halle, M. et. al., "The Ultragram: A Generalized Holographic Stereogram," *Proc. Soc. Photo-Opt. Instrum. Eng.* (SPIE), vol. 1461, Practical Holography V, p. 142 (February 1991), the disclosure of which is incorporated herein by reference. Although widely used, typical pre-distortion techniques for one-step methods for producing full-parallax, holographic stereograms are significantly limited by available computer processing speeds and the resolution of images produced by traditional one-step methods. In addition, techniques for pre-distorting one-step, full-parallax, holographic stereograms have not been able to produce comprehensible, animated, one-step, full-parallax, holographic stereograms.

Apparatus for printing one-step, monochromatic, holographic-stereograms have been developed. Typically, such prior art printers, as depicted in FIG. 1, include: a monochrome coherent light source 1, lenses 42, mirrors 40, an optical system 89, a shutter 10, a mechanism for translating film 69, holographic recording material 70, usually in the form of film, a personal computer 85 to control the timing for the exposure sequence, and a separate high-speed computer 87 for image calculations. The prior art printer depicted in FIG. 1, was discussed in two articles by Yamaguchi. Yamaguchi, M., et. al., "Development of a Prototype Full-Parallax Holoprinter," *Proc. Soc. Photo-Opt. Instrum. Eng.* (SPIE), vol. 2406, Practical Holography IX, pp. 50–56 (February 1995); and Yamaguchi, M., et. al., "High-Quality Recording of a Full-Parallax Holographic Stereogram with a Digital Diffuser," *Optics Letters*, vol. 19, no. 2, pp. 135–137 (Jan. 20, 1994), the disclosures of each are incorporated herein by reference. The prior art printer depicted in FIG. 1 is capable of producing monochromatic holographic stereograms, but not full-color holographic stereograms.

A typical prior art hologram printer, like the one depicted in FIG. 1, usually is supported by a vibration isolation table 80. In addition, the prior art printer depicted by FIG. 1 uses a HeNe laser for a light source 1 that produces a coherent light beam 5 that may be collimated. A shutter 10 is placed at the output of light source 1. A beam-splitter 15 splits the light 5 from the light source 1 into an object beam 20 and a reference beam 25. The polarization of the object and reference beams 20, 25 are adjusted by a pair of half-wave plates 30 and a pair of polarizers 35. The half-wave plates 30 and polarizers 35 also control the ratio of the beams. The prior art printer also uses a number of mirrors 40. In addition, the prior art printer uses a system of enlarging lenses 42 to distribute the object beam 20 from the light source 1 into the optical system 89 depicted in FIG. 1.

The optical system 89 of the prior art printer of FIG. 1 includes a band-limited diffuser 45, a liquid crystal display panel (LCD panel) 50, and a converging lens 55. A band-limited diffuser is a diffuser with a deterministic phase pattern designed to diffuse light in a specific pattern or direction. The band-limited diffuser 45 depicted in FIG. 1 is specifically designed for the monochromatic light source being used—a HeNe laser. The LCD panel 50 used in the prior art printer of FIG. 1 is a gray scale, electrically addressed panel with twisted-nematic liquid crystals. The LCD panel 50 receives image data calculated by a high-speed computer 87 by an analog video signal. The converging lens 55 shown in FIG. 1 focuses the images from the LCD panel 50 to the holographic recording material 70. The converging lens 55 generally has a low f-number in order to produce a wide angle of view. Due to the need to correct for spherical aberrations along the optical axis, Yamaguchi utilized a converging lens 55 composed of three lenses to reduce spherical aberration and realize a f-number of around 0.8.

To prevent the exposure of parts of the holographic recording material 70 that are not part of the elemental hologram 110 meant to be exposed, the prior art printer of FIG. 1, uses, in close proximity to the holographic recording material 70, an object beam masking plate 60 with an aperture the size of the elemental hologram 110 to prevent the object beam 20 from exposing other parts of the holographic recording material 70.

The band-limited diffuser 45 shown in FIG. 1 improves the uniformity of the distribution of the object beam 20 over an elemental hologram on the holographic recording material 70. If the band-limited diffuser 45 is designed such that an object beam 20 is focused only over the area of an elemental hologram, then an object beam masking plate 60 is not needed to prevent exposure of areas outside the elemental hologram. However, if used with such a band-limited diffuser, the object beam masking plate 60 may have an aperture larger than the size of the elemental hologram 110. An object beam 20 and a band-limited diffuser 45 that allow even illumination of an elemental hologram 110 by an object beam 20 need to be matched by a reference beam masking plate 65 with an aperture the size of the elemental hologram 110. Because the required matching of a object beam 20, a band-limited diffuser 45, and reference beam masking plate 65 to the size of a desired elemental hologram, it has been difficult to change the sizes of elemental holograms exposed by a hologram printer. Because of this lack of flexibility, prior art printers cannot easily print holograms having different sizes of elemental holograms, and are restricted to printing holograms with single, fixed-sized elemental holograms.

FIGS. 2–4 illustrate alternative prior art embodiments of optical systems that function in the same way as the optical system 89 depicted in FIG. 1.

In FIGS. 2–4, an object beam 20 is directed through a SLM 90 that has a sample image point 100 on its surface. The object beam 20 may be normal to the SLM surface or off-axis from the normal. SLM 90 may also have an array of pixels 95. LCD panels, cinematography film, and transparencies have been used as SLMs 90.

In FIG. 2, the object beam is directed through a simple diffuser 105, such as a section of ground glass, that scatters light. When a simple diffuser 105 is used, then an object beam masking plate 60 must be used to prevent exposing areas of the holographic recording material 70 outside of the elemental hologram 110 that are not meant to be exposed.

In FIG. 3, an object beam 20 is directed through a holographic optical element (HOE) 115. A HOE is a hologram that is specially designed to redirect light emanating from a source in a certain way. For instance, a HOE may be designed to act as a lens to converge light to a single point. As another example, a HOE may be designed to act as a band-limited diffuser that is paired with a lens to converge light over an area rather than at a single point. The HOE 115 depicted in FIG. 3 is one that is designed to evenly expose an area the size and shape of an elemental hologram 110. When such a HOE is used, an object beam masking plate 60 (shown in FIG. 2) need not be used at all or, if used, may have an aperture larger than the size of the elemental hologram 110 to be exposed.

In FIG. 4, an object beam 20 is directed through a band-limited diffuser, which may be a band-limited digital diffuser, 45 and a converging lens 55. The band-limited diffuser 45 depicted in FIG. 4 is designed to converge the object beam 20 over the area of elemental hologram 110. Thus, an object beam masking plate 60 (shown in FIG. 2) need not be used at all or, if used may have an aperture larger than the size of the elemental hologram 110 to be exposed.

In FIGS. 2–4, the sample image point 100 is an image point of the SLM 90 that is recorded in an elemental hologram 110 on a holographic recording material 70. Reference beam 25 is directed at the elemental hologram 110 such that the interference pattern formed by the interaction of the object beam 20 and the reference beam 25 may be recorded on the elemental hologram 110 on the holographic recording material 70.

To expose a two-dimensional array of elemental holograms, the prior art printer of FIG. 1 uses a mechanism for translating holographic film 69 that includes pulse controlled motors 71. Typically, the holographic recording material 70 in a prior art printer is photographic film. The film is held between the object beam masking plate 60 and the reference beam masking plate 65. Both masking plates 60 and 65 have apertures that are the size of the elemental holograms 110 being exposed. The masking plates 60 and 65 are moved by a solenoid 72. Pulse controlled motors 71 translate the film in two directions.

In the prior art system depicted in FIG. 1, the timing of the exposure sequence is controlled by a personal computer. Thus, the solenoid 72, as well as the pulse controlled motors 71 and the shutter 10, are controlled by the personal computer 85. In contrast, the images for the exposures are calculated off-line by a high-speed computer 87. The image calculations are transferred by an analog video signal to the LCD panel 50.

For a holographic stereogram to be reconstructed, an illumination source must be placed at an appropriate angle. If the illumination source is not placed correctly, a holographic stereogram will not be reconstructed or will appear with distortions, such as magnification distortions. Despite advances in holographic techniques and equipment, the display is illumination geometry of a one-step, holographic stereogram remains a problem. The display illumination geometry, i.e., the placement of an illumination source with respect to a holographic stereogram, depends on the cumulative effect of the angles at which a reference beam exposed each of a holographic stereogram's elemental holograms. For example, if all of the elemental holograms on a holographic stereogram are exposed at a constant angle, and if the surface of the holographic stereogram is flat, then a collimated illumination source is required to properly reconstruct the stereogram without defects such as magnification distortion.

Furthermore, in practice, it has been common to create reflection holographic stereograms which are meant to be illuminated with a diverging light source such as a point source. However, the prior art has not overcome the difficulty in designing a printer in which the angle of a reference beam is automatically and flexibly changeable to allow reconstruction by a point source and with minimal distortion.

In addition, it remains difficult to control the resolution or elemental hologram density of a holographic image. The sharpness of a holographic image depends on the image resolution and the extent of any blurring. Blurring can be caused by having a large illumination source, such as that of a long florescent light, illuminate a hologram. In addition, blurring can be caused by the large spectral spread of an illumination source. If an illumination source that is small and monochromatic, such as a laser source expanded through a microscope objective lens (i.e., a small, inexpensive, achromatic, high-power lens), is used, blurring may be minimized, and the sharpness of the holographic image will mainly depend on the image resolution of the hologram.

The image resolution of a three-dimensional image is defined as the volumetric density of individually distinguishable image points in an image volume. For one-step, holographic stereograms, including full-parallax and horizontal-parallax holograms, this resolution is usually not constant throughout an image volume. For small images of little depth, the variation of image resolution with depth is hardly noticeable. However, for holographic stereograms with significant depth, the variation in image resolution with depth can be very apparent.

As shown in FIG. 5, if the light from an illumination source 130 that is the same type of light source as that which generated the reference beam 25 that exposed an elemental hologram 110 illuminates the elemental hologram 110 from the appropriate conjugate angle, the reconstruction 125 of the sample image point 100, (shown in FIGS. 2–4), on the reconstruction 120 of the image of the SLM is formed at the same apparent distance and position relative to the elemental hologram 110 as it appeared to the elemental hologram 110 at the time of recording.

FIG. 6 shows lines drawn from the boundaries between neighboring elemental holograms 110 on a holographic recording material 70 through the boundaries between neighboring reconstructed pixels 135 of the reconstructed image 120 of a SLM. The areas bounded between the lines drawn from the boundaries of at least two elemental holograms represent independently addressable volume elements, or voxels 140. A voxel 140 is a component unit which represents an arbitrary three-dimensional object or scene.

Assuming that the elemental holograms 110 are larger than the SLM pixels, as shown in FIG. 6, the sizes of the voxels 140 increase with increasing distance from the surface of a reconstructed image of a SLM 120. If the sizes of the voxels 140 are too coarse relative to the desired detail size of a three-dimensional object or scene, the reproduced image will be poor or indiscernible. If the three-dimensional image of an object or scene extends over a wide range of depth, a variation in the sizes of the voxels will also be very undesirable because such a variation would lead to poor image quality.

Thus, hologram printers of the prior art have limitations that make them impractical for commercial purposes. In particular, these prior art printers suffer from: lack of ability to print full-color holographic stereograms; lack of ability to simultaneously expose multiple elemental holograms; lack of flexibility to quickly and easily adjust a hologram printer to print at different elemental hologram sizes; lack of flexibility to easily change the angle of a reference beam to a holographic recording material; lack of ability to control the resolution of a hologram; and lack of ability to create computer generated images which display animation or different images with a change of viewing position.

Similarly, conventional systems used to replicate an original, or "master" hologram, suffer several limitations. Conventional replication systems typically couple or mount a master hologram to a surface, such as a glass plate. Holographic recording material, usually either photopolymer or silver-halide film, is then positioned on the surface opposite the master hologram. Once the master and the recording material are in place, a laser beam is directed toward the film using either a "flood" beam method or scanning beam method. A "flood" beam is formed when the source laser beam is diverged by a fixed-position lens so that it simultaneously and evenly covers the hologram surface to be replicated. A scanning beam is a thin collimated laser beam which is reflected toward a portion of the hologram via a scanning mirror which can pivot about a fixed point on the mirror surface. The mirror is pivoted through a range of angles such that, in time, the beam traces a path which evenly illuminates the entire hologram surface to be replicated. In many cases, the flood beam or scanning beam is passed through a large lens prior to striking the hologram in order to form an aggregate collimated or aggregate converging beam to intersect the hologram. The large lens can prevent the beam from diverging.

The beam passes through the film, and portions of the beam reflect off of the master hologram. The interference pattern formed by the intersection of the reflected portion of the beam and the original portion of the beam are recorded on the film to create the replicated hologram.

Scan or flood replication systems suffer from similar problems as conventional holographic printing systems. Namely, such replication systems lack the ability to independently vary the angle of incidence a beam will strike portions of the hologram to be replicated. In order replicate a hologram that will reconstruct properly, the angle of incidence of the replication system's beam should approximate the angle of incidence of the eventual illumination source. If the angle of incidence of the beam is not correct, portions of the reconstructed image either will not reconstruct or will appear with distortions, such as magnification distortions. Conventional replication systems, such as flood or scan systems, direct the beam at the master hologram from a fixed point. Thus, the angle of incidence the beam will strike the master hologram is fixed for each portion of the hologram-and may not match the angle of incidence of the eventual illumination source. Therefore, portions of the replicated images may not properly reconstruct.

An additional disadvantage of conventional replication systems is that it is difficult for conventional replication systems to properly replicate multiple original holograms with different reconstruction geometries. This disadvantage results because the optical system of conventional replication systems must be reconfigured for each reconstruction geometry.

SUMMARY OF THE INVENTION

In accordance with the present invention, an apparatus and method for replicating a hologram using a steerable beam are disclosed that provide significant advantages over prior developed replication systems.

According to one aspect of the present invention, an apparatus for replicating a hologram comprises an assembly operable to position a hologram in proximity to holographic recording material. The apparatus further comprises a beam steering unit operable to direct a beam at component portions of the hologram to replicate the component portions onto a holographic recording material. The beam steering unit is further operable to enable independently variable angles of incidence at which the beam strikes each component portion.

According to another aspect of the present invention, a method for replicating a hologram is provided. The method comprises positioning a holographic recording material proximate a hologram. The holographic material can record a replicated image of the hologram. A beam is directed at component portions of the hologram to replicate the component portions onto the holographic recording material. The angle of incidence at which the beam strikes each component portion is independently variable.

It is a technical advantage of the present invention that the angle of incidence of a reference beam can be varied for each component portion when replicating a hologram.

It is a further technical advantage of the present invention in that it can produce a replicated image that, when reconstructed, more closely resembles the reconstructed original hologram than replicated images produced by conventional replication systems.

It is another technical advantage of the present invention that holograms with different reconstruction geometries can be replicated without reconfiguring the optical systems of the replication system.

Other technical advantages should be apparent to one of ordinary skill in the art in view of the specification, claims, and drawings.

BRIEF DESCRIPTION OF THE DRAWINGS

The following drawings form part of the specification and are included to further demonstrate certain aspects of the present invention. The invention may be better understood by reference to one or more of these drawings in combination with the detailed description of specific embodiments presented herein.

DETAILED DESCRIPTION OF THE INVENTION

The following examples are included to demonstrate illustrative embodiments of the present invention. It should be appreciated by those with skill in the art that the techniques disclosed in the following examples represent techniques discovered by the inventors to function well in practice, and thus can be considered to constitute exemplary modes for its practice. However, those with skill in the art will, in light of the present disclosure, appreciate that many changes can be made in the specific embodiments which are disclosed and still obtain a like or similar result without departing from the spirit and scope of the invention. For instance, a HOE or other appropriate optics may replace the combination of a lens and a band-limited diffuser. In addition, a HOE may also replace a lens or a combination of lenses. Furthermore, SLMs may include, but are not limited to LCD panels, digital micro-mirror arrays, film, or transparencies. In addition, computer storage devices may include, but are not limited to hard disks, static or dynamic RAM, flash memory, DVD drives, or tape drives. Moreover, motors may include, but are not limited to DC servo motors, stepper motors, or actuators.

The present invention provides a system and method for printing one-step, full-color, full-parallax holographic stereograms. The invention further includes a system and method for replicating holograms. Some presently illustrated embodiments are depicted in FIGS. 7–34.

Figure 7:
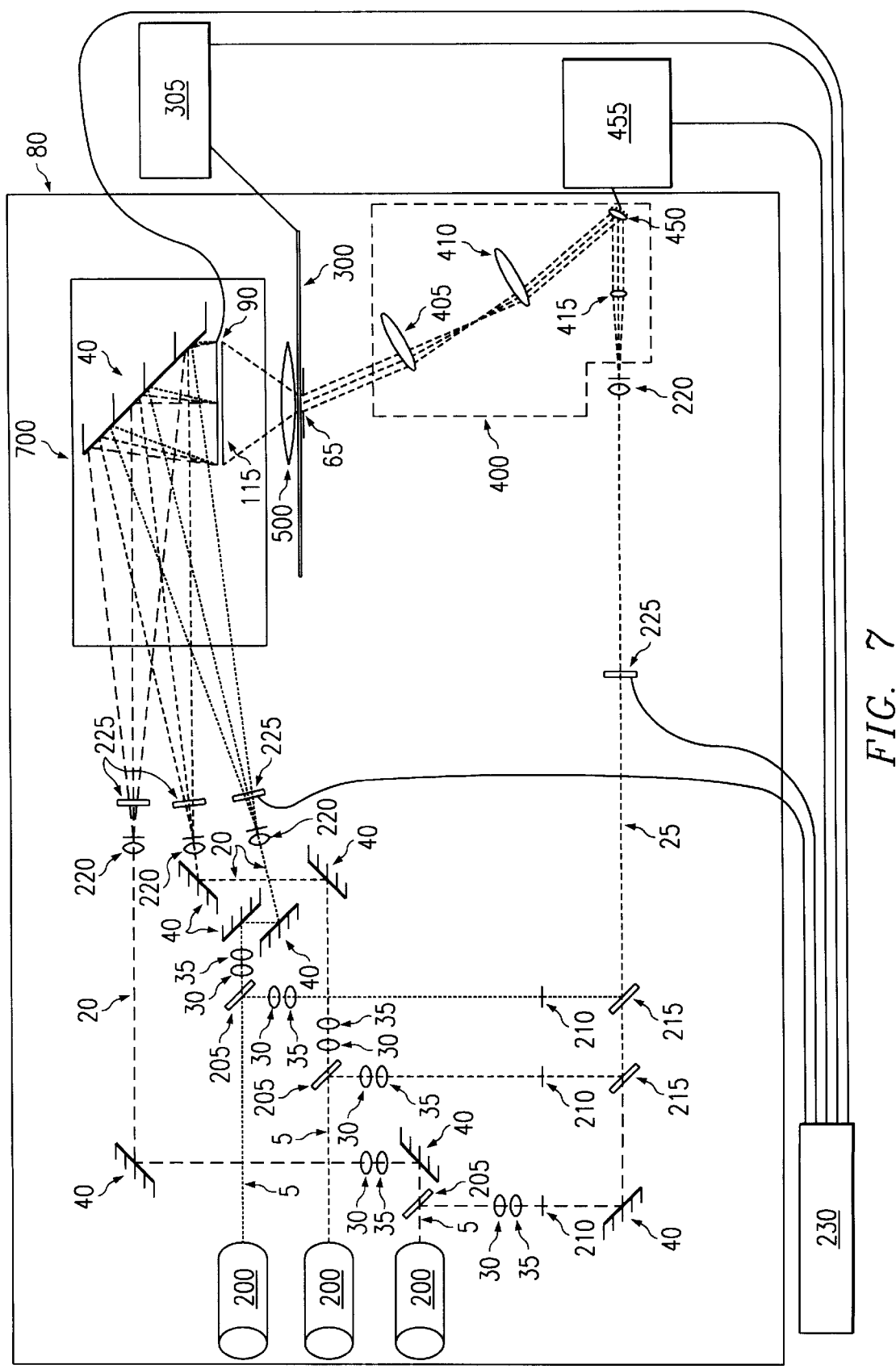
FIG. 7 is a top-view, schematic drawing of one embodiment of a one-step, full-color, full-parallax printer for holographic stereograms.

One embodiment of a printer is illustrated in FIG. 7. As depicted in FIG. 7, most of the parts of the printer, except for a computer 230 and controllers 305 and 455, are isolated from vibrations by, for example, being supported on vibration isolation table 80. The table 80 may be composed of steel with a honeycomb interior. The legs of the table 80 may be air pistons which can absorb vibrations. Other types of vibration isolation may also be acceptable. In some embodiments, the computer 230 and controllers 305 and 455 may be supported on table 80. The computer 230 may have multiple ports and serial or parallel cables through which the computer 230 can control devices, like motor controllers, or through which the computer 230 can send output, such as images. In addition, computer 230 may have computational power and speed sufficient for three-dimensional computer graphics. Furthermore, computer 230 may include one or more central processing units and may include one or more storage devices, for example, hard disks, a redundant array of independent disks, FLASH memory, or static or dynamic RAM, in which rendered images are stored. If more than one central processing unit is used, they may operate independently or in parallel. If more than one storage device is used, they may also operate independently or in parallel. In some embodiments, lasers 200 are not supported by table 80. The lasers 200 may be lasers of three different colors. For example, one laser 200 may be a krypton ion or a HeNe laser to produce a red beam of light, another laser 200 may be an argon ion or a YAG laser to produce a green beam of light, and a third laser 200 may be an argon ion or a HeCd laser to produce a blue beam of light Other light wavelengths are also acceptable. In addition, lasers 200 may be solid state diodes or other types of lasers. The beams of light from the lasers 200 may go through open air. In addition, the beams of light from the lasers 200 may go through pipes so that instabilities due to air currents will be reduced. Also, the beams may be transmitted through polarization-preserving optical fibers.

In FIG. 7, the coherent light beams 5 produced by the lasers 200 are directed at variable beam splitters 205. Variable beam splitters are half-mirrors that split a beam by reflecting part of the beam and transmitting most of the rest of the beam. If fiber optics are used to transmit beams, then fiber optic beam splitters that work by contacting two parallel fibers together and letting the light from the fibers couple may be used. The coherent light beam 5 from each of the lasers 200 is split into two beams, an object beam 20 and a reference beam 25. In some embodiments, each object beam 20 and each reference beam 25 may be directed through half-wave plates 30 and polarizers 35. In other embodiments, if polarization-retaining fiber optic cables are used to transmit a beam and if the cables are rotatable about their center axes, half-wave plates 30 need not be used. If needed, each object beam may be reflected off one or more mirror(s) 40. The mirrors 40 of the present embodiment may be, for example, first surface or front surface mirrors. Each object beam 20 may be directed through a low pass spatial filter 220 to remove unwanted noise. A low pass spatial filter 220 may include a microscope objective lens and a pinhole. Each object beam 20 may then pass through a beam shutter 225. In one embodiment, the beam shutters 225 may be high-speed, mechanical iris shutters, for example, those used in the photography industry. In other embodiments, the beam shutters 225 may be electro-optical systems such as liquid crystal cells or acousto-optical modulator crystals. In another embodiment, instead of using separate beam shutters 225, the SLM 90 in the object beam unit, generally 700, can function as a shutter for all three object beams. The shutters 225 are controlled by the computer 230. The object beams 20 may be then directed through an object beam unit 700. In the object beam unit 700, the object beams 20 may be directed such that the object beams 20 converge at the plane of a SLM 90. SLM 90 may include, but is not limited to, a transmissive LCD panel, a reflective LCD panel, an optically addressed LCD panel, a digital micro-mirror array, film, a projection or a transparency. The SLM 90 may receive image input by a video cable from the computer 230. In addition, multiple SLMs may receive images generated in parallel by multiple central processing units. Moreover, multiple SLMs may receive images from the storage device or devices of computer 230. After passing through the SLM 90, the object beam 20 may pass through a HOE 115, or another system, like those illustrated in FIGS. 2–4, that is designed to converge the object beam and evenly expose an area the size of an elemental hologram. In one implementation, the HOE 115 may be a transmission-type hologram that can converge three different monochromatic object beams at slightly different angles onto the elemental holograms to be exposed without allowing zeroth-ordered light from any of the object beams to intersect the elemental holograms to be exposed. After passing through the object beam unit 700, the object beam 20 may then be transmitted through a voxel control lens 500 and may then expose an elemental hologram 110 on a holographic recording material 70 in a material holder 300. The holographic recording material 70 may be, but is not limited to, a pan-chromatic photopolymer, a pan-chromatic or monochromatic silver halide photographic emulsion, dichromated gelatin, or other suitable photopolymers. The holographic recording material 70 may be held securely by a material holder 300 that may be able to translate the holographic recording material in two directions. The movement of the material holder 300 may be controlled by film holder motor controller 305 which may be controlled by computer 230.

As further depicted in FIG. 7, after the beams are split into object beams 20 and reference beams 25 by the variable beam splitters 205, each of the reference beams 25 passes through a variable attenuator 210 which allows the intensity of each reference beam 25 to be independently adjusted. The reference beams may be reflected off of a mirror 40 before passing through dichroic combiners 215 or other suitable optical combiners. A dichroic combiner is a wavelength selective mirror which reflects some wavelengths, but is transparent to other wavelengths. The dichroic combiners 215 in FIG. 7 combine the three reference beams 25 into one beam which may then pass through a beam shutter 225 before passing through a low pass spatial filter 220. The reference beam 25 then passes through a reference beam steering system 400 which controls the angle with which the reference beam 25 intersects the holographic recording material 70. A beam-steering mirror system of the reference beam-steering system is controlled by a mirror system motor controller 455 that is controlled by computer 230.

Furthermore, the present embodiment allows separate elemental holograms to be printed in different colors. For instance, by placing a beam shutter in the path of each object beam and reference beam and then selectively closing the beam shutters, one elemental hologram may be exposed to only red object and reference beams, another may be exposed to only green object and reference beams, and another may be exposed to only blue object and reference beams.

Figure 8:
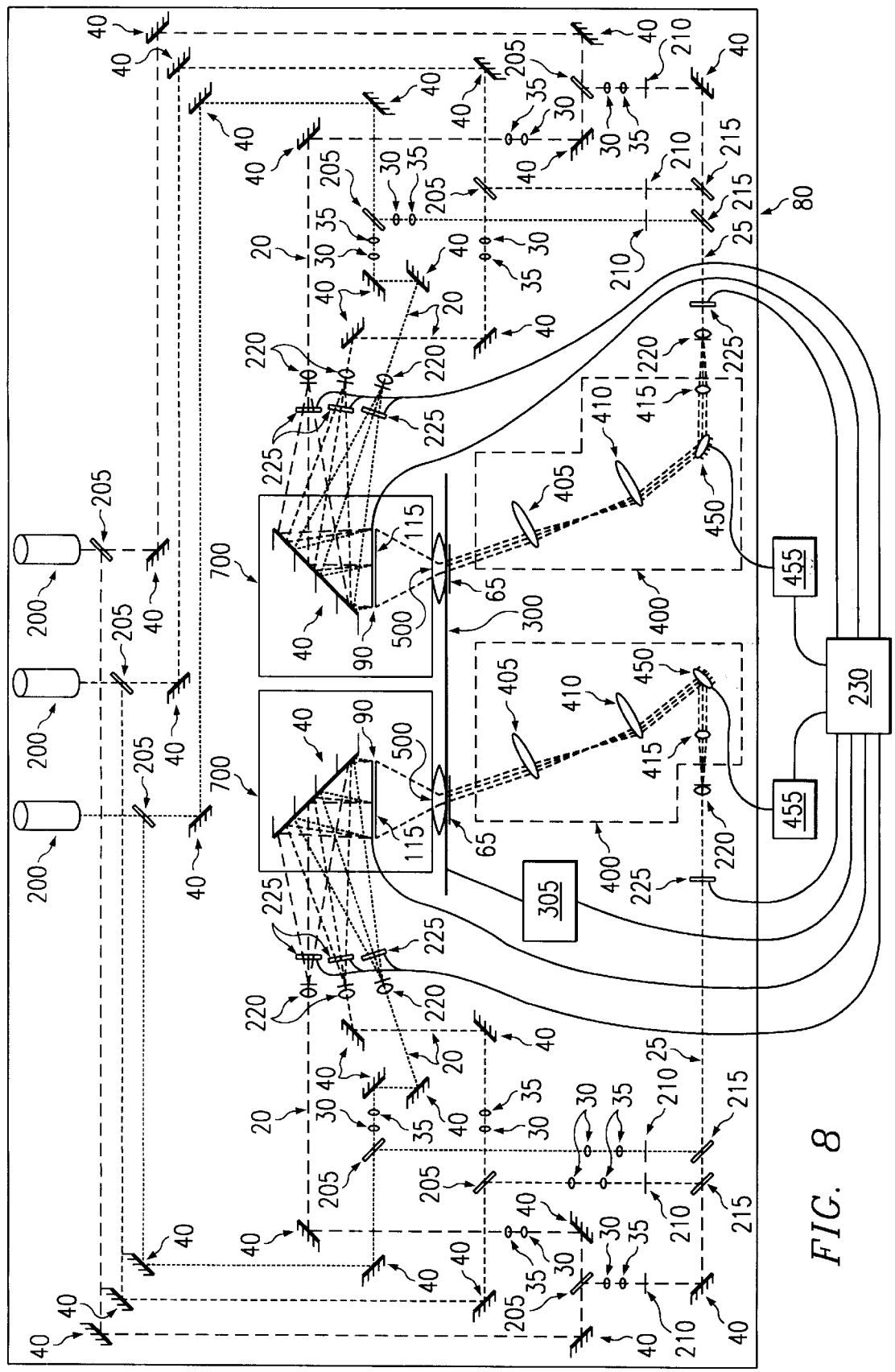
FIG. 8 is a top-view, schematic drawing of another embodiment of a one-step, full-color, full-parallax printer for holographic stereograms.

An embodiment in which multiple elemental holograms are simultaneously exposed is depicted in FIG. 8. The beams from lasers 200 are split by variable beam splitters 205 and then after being reflected by mirrors 40 are split again by additional variable beam splitters 205, thereby forming two or more object beams 20 and two or more reference beams 25 from each laser 200. In other embodiments, the beams from lasers 200 may be split even more times to form more object beams 20 and more reference beams 25. Each object beam 20 passes through a low pass filter 220 and a beam shutter 225. Each set of three object beams 20 may be reflected by mirrors 40 and pass through a SLM 90, a HOE 115, and a voxel control lens 500 to expose an elemental hologram 110 on a holographic recording material 70 held by a material holder 300. The movement of the material holder 300 is controlled by film holder motor controllers that are controlled by computer 230. Each set of three reference beams 25 passes through variable attenuators 210 and are combined into a beam by a dichroic combiner 215 or other suitable optical combiners. Each of the resulting two reference beams 25 passes through a beam shutter 225 and a low pass spatial filter 220. Each reference beam 25 then passes through a beam-steering system 400 before hitting an elemental hologram 110. Thus, as depicted in FIG. 8, multiple elemental holograms may be simultaneously printed.

Figure 1A:
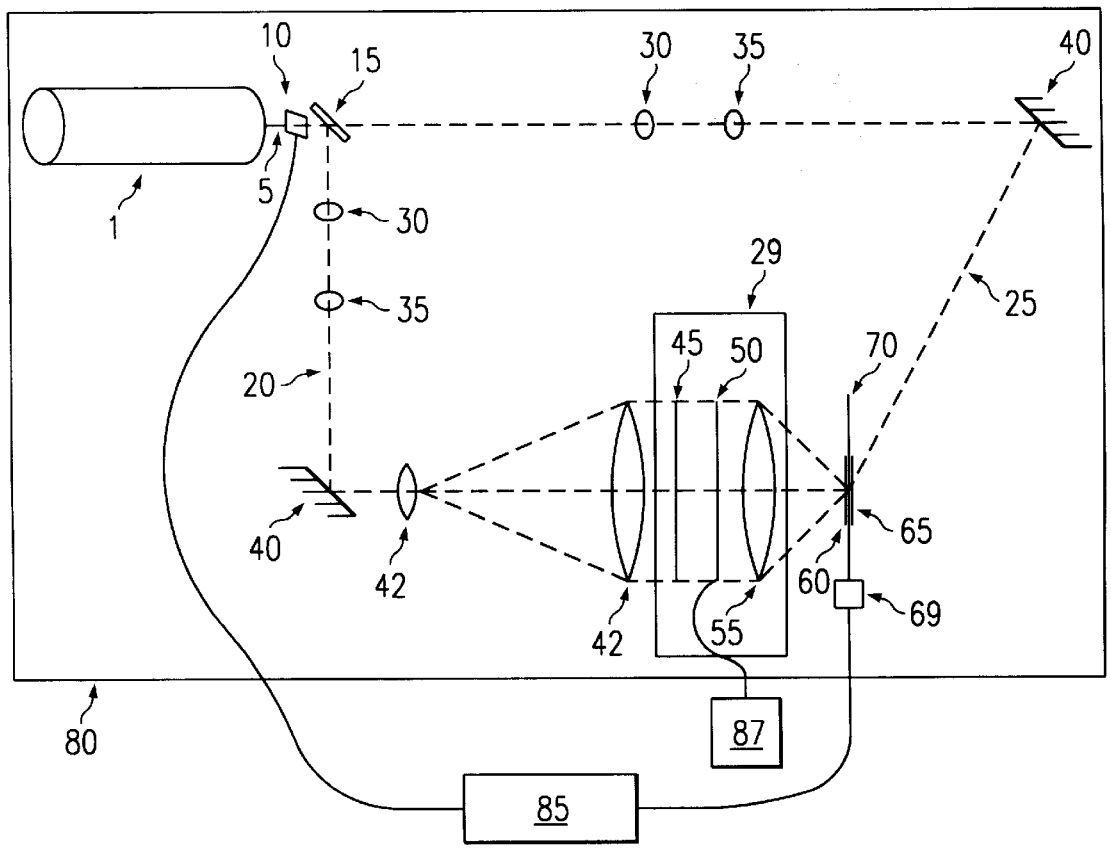
FIGS. 1(a) and (b) are schematic, top-view drawings of a prior art hologram printer.
Figure 1B:
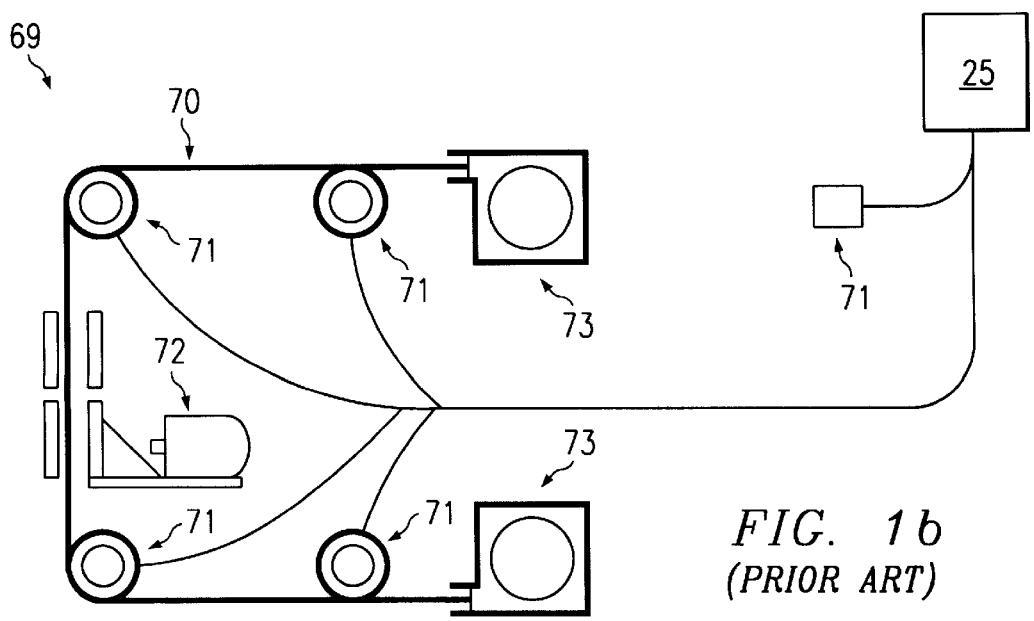
Figure 2A:
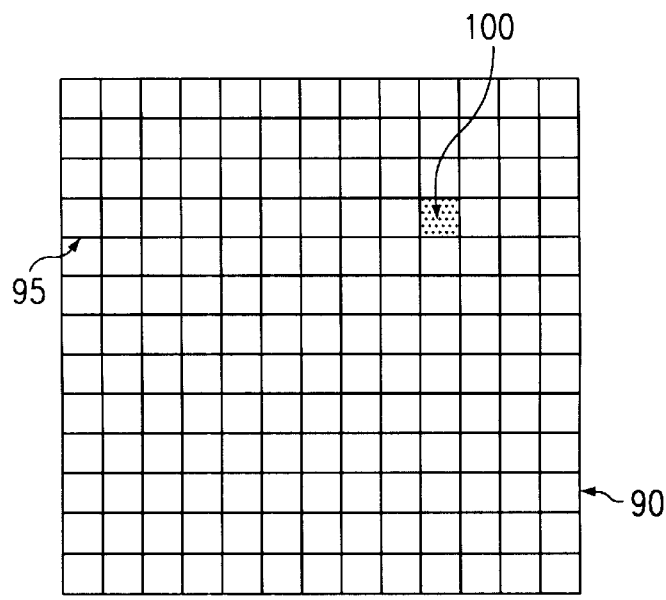
FIGS. 2(a) and (b) are simplified, top-view illustrations of a one-step, reflection, elemental hologram recording using an optical system including a simple diffuser.
Figure 2B:
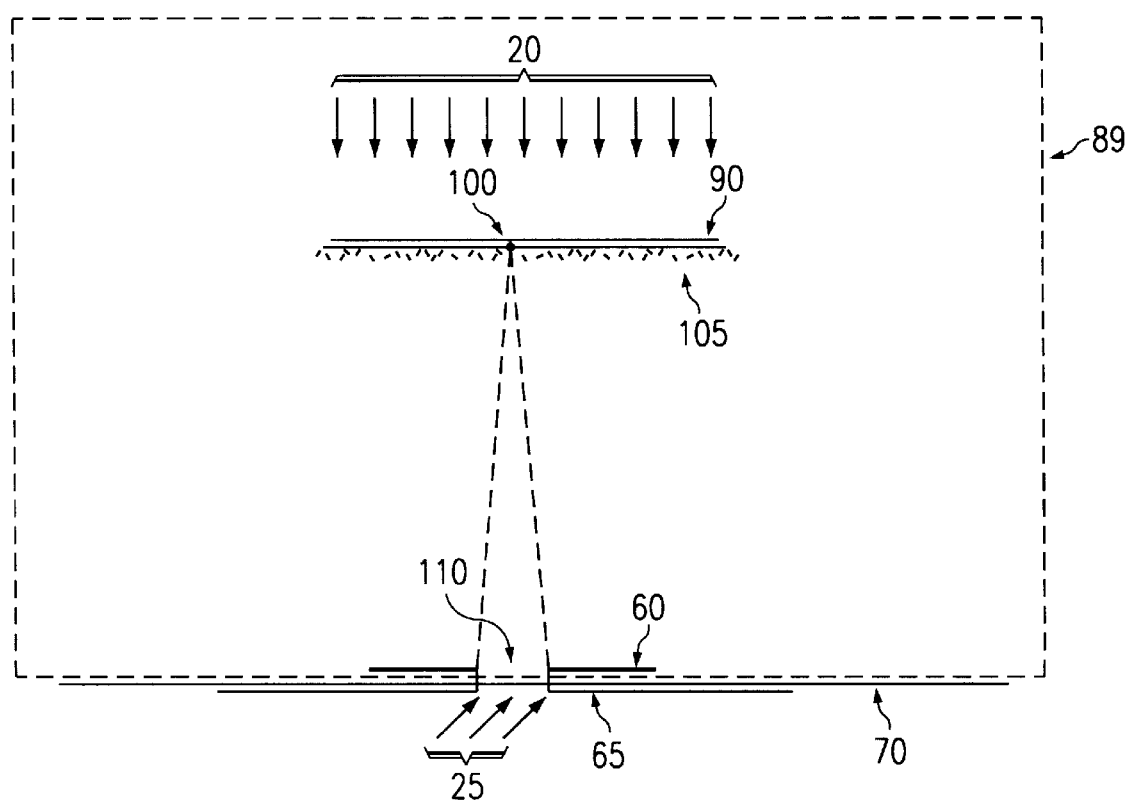
Figure 3:
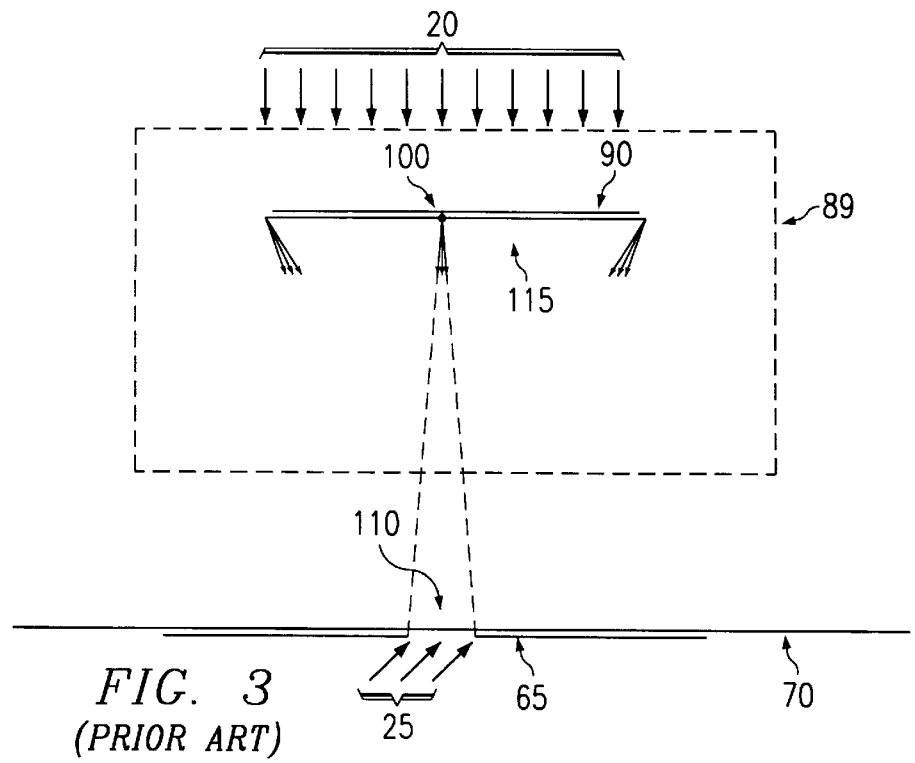
FIG. 3 is a simplified, top-view illustration of a one-step, reflection, elemental hologram recording using an optical system including a holographic optical element.
Figure 4:
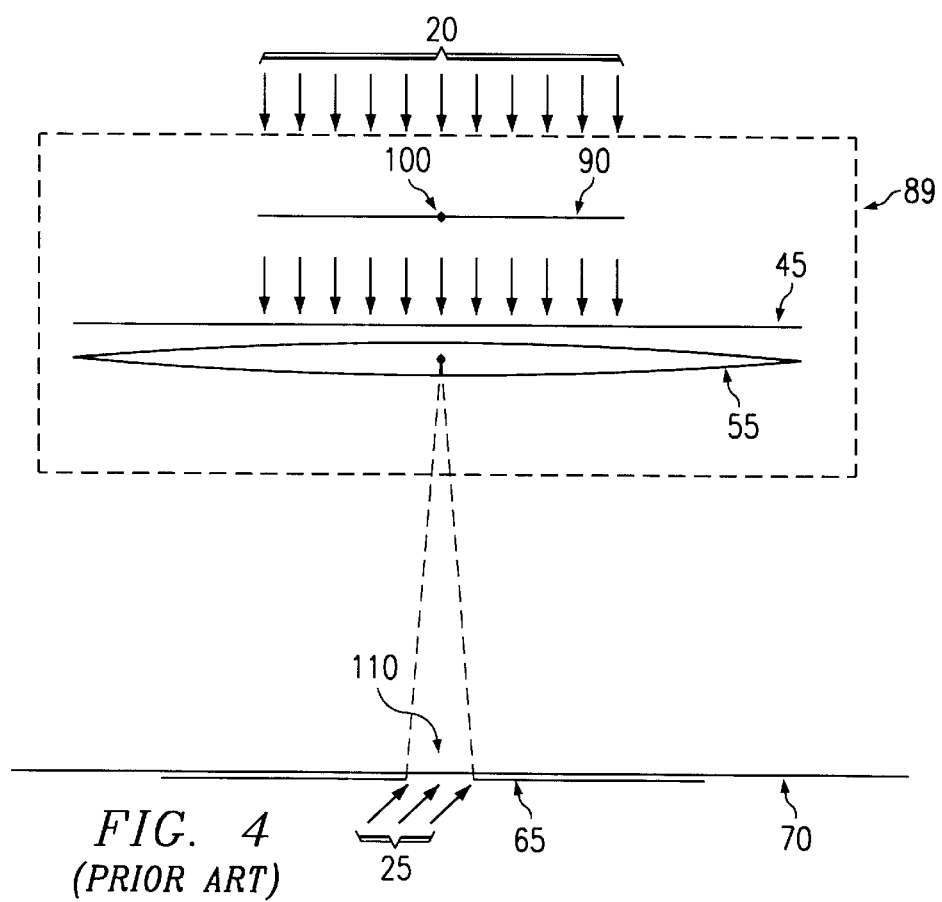
FIG. 4 is a simplified, top-view illustration of a one-step, reflection, elemental hologram recording using an optical system including a band-limited diffuser and a converging lens.
Figure 5:
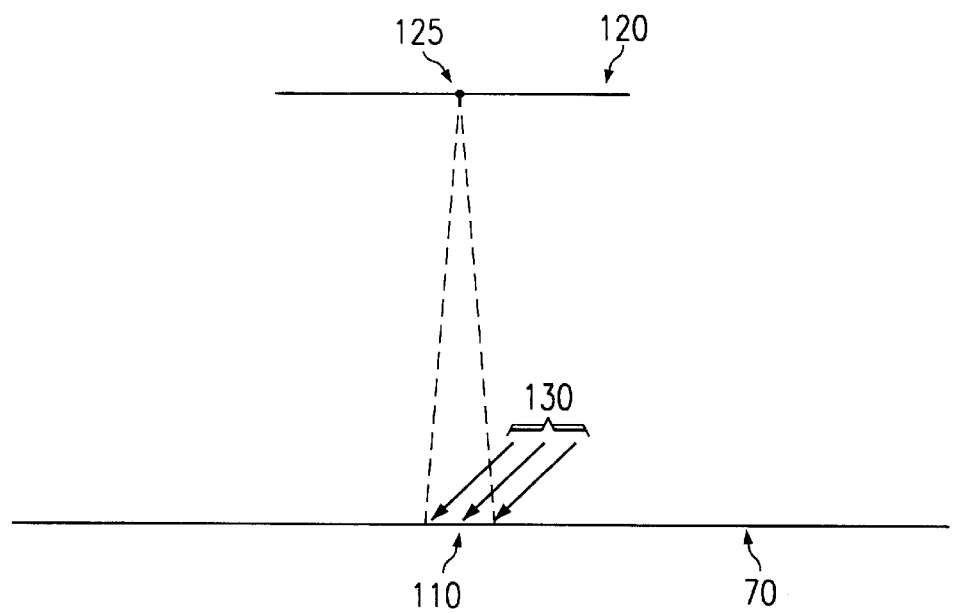
FIG. 5 is a simplified, top-view illustration of the reconstruction of an elemental hologram of a holographic stereogram.
Figure 9:
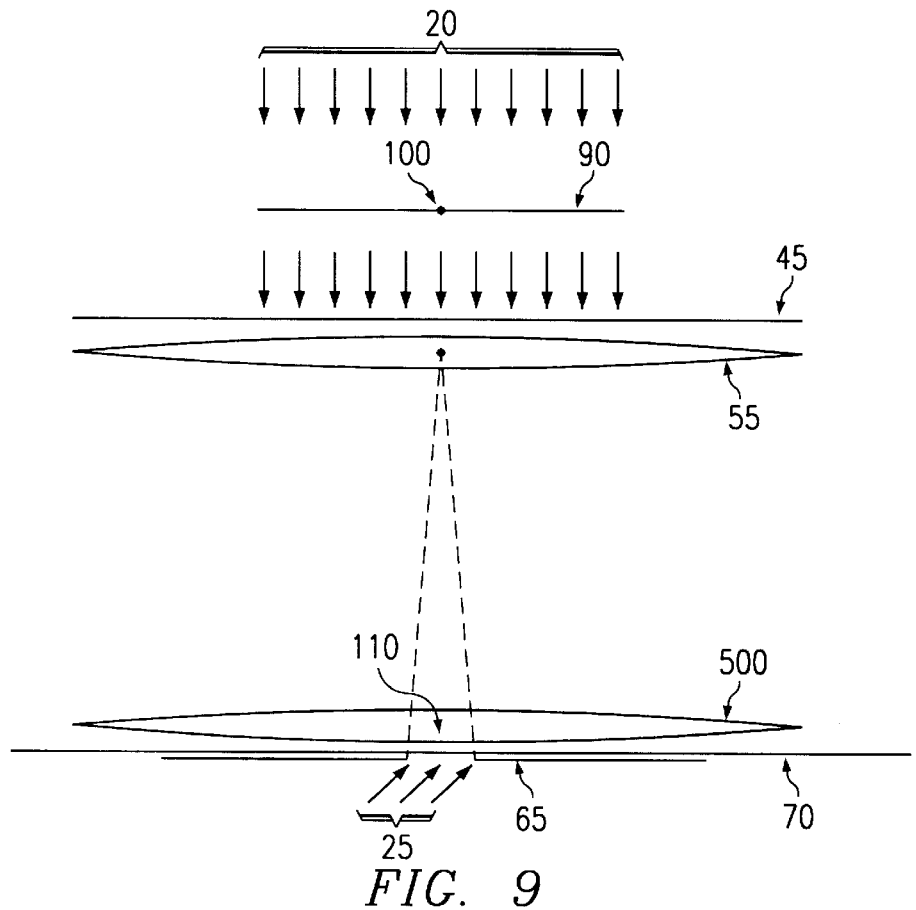
FIG. 9 is an illustration of a particular embodiment of the invention to control the variation in sizes of voxels.
Figure 10:
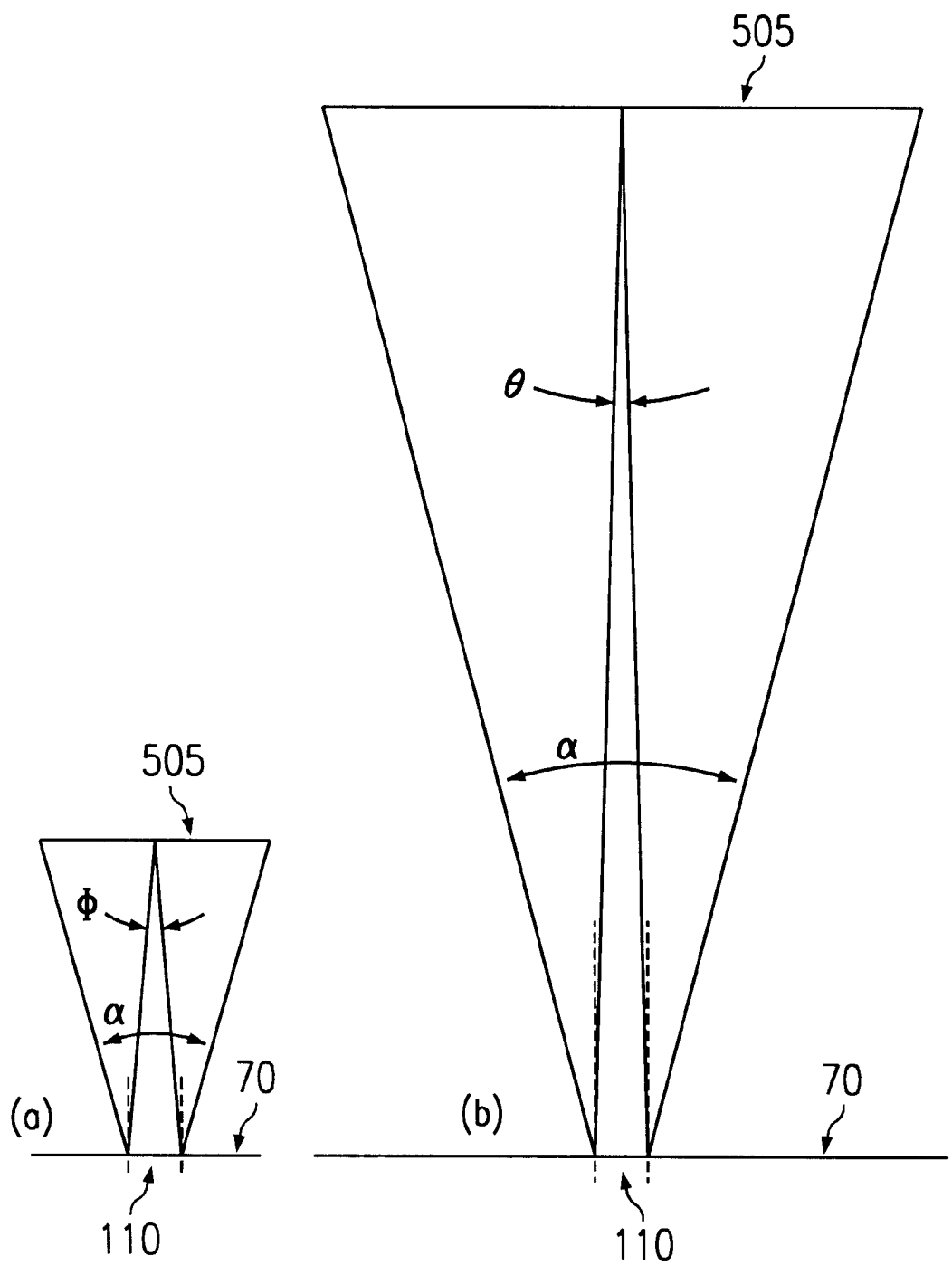
FIGS. 10(a) and (b) illustrate how the apparent distance of a SLM, as seen by an elemental hologram, may change when a voxel-control lens is utilized.

An embodiment in which the variation in voxel size is controlled is illustrated by FIGS. 9 and 10. As shown in FIGS. 9 and 10, this control is accomplished by placing a voxel-control lens 500 in the path of an object beam 20 between SLM 90 and holographic recording material 70. The voxel-control lens 500 may be placed in close proximity to holographic recording material 70. The voxel-control lens 500 may be capable of making an SLM or a projected image of a SLM seen from the viewpoint of an elemental hologram 110 appear at a greater apparent distance relative to the holographic recording material 70 during recording, so that a sample image point 100 on the SLM 90 surface is reconstructed at a greater distance away from the holographic recording material 70. FIG. 10(a) illustrates how an image 505 of a SLM may appear to an elemental hologram 110 in a printer without a voxel-control lens. FIG. 10(b) illustrates how an image 505 of a SLM may appear to an elemental hologram in a printer with a voxel-control lens 500. As shown in FIG. 10, the voxel control lens magnifies the image 505 of an SLM, such that the angle $\alpha$ subtended by the image does not change but the angle $\phi$ subtended by an elemental hologram decreases to $\theta$ when a voxel control lens is used. The distance between the image 505 of a SLM and the holographic recording material 70 may be varied by varying the focal length of the voxel-control lens 500 or its position between the holographic recording surface 70 and the converging lens 55 or other optical systems, including simple diffusers or HOEs, as shown in FIGS. 1–3, used in the prior art to converge light onto the holographic recording material 70. In some embodiments, the voxel control lens 500 may be part of the object beam unit 700.

Figure 6:
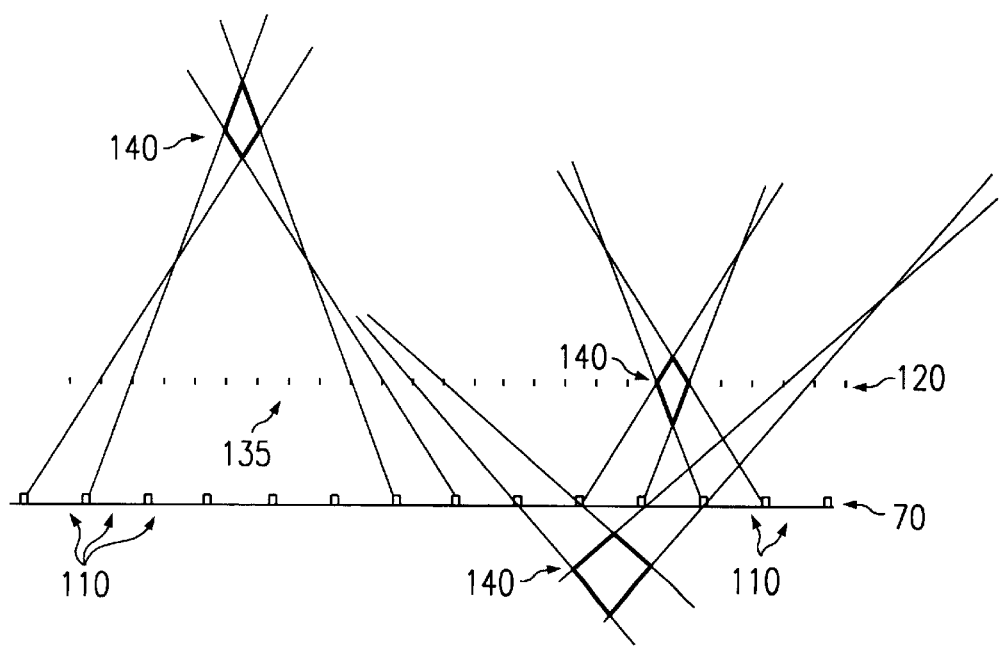
FIG. 6 is an illustration of the changes in sizes of voxels with distance from a reconstructed image of a SLM.
Figure 11:
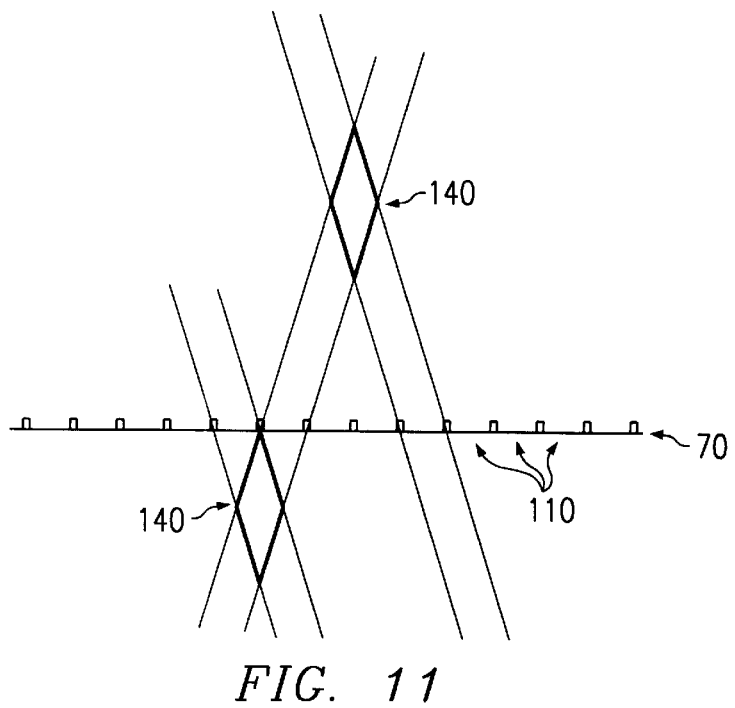
FIG. 11 is an illustration of voxel boundary lines that are approximately parallel to each other.

In one particular embodiment of this invention, it is possible to make the voxel sizes fairly constant over a wide range of distances from a holographic recording material 70. This is accomplished by choosing a voxel-control lens 500 with a focal length equal to the distance between the voxel-control lens 500 and the actual location of the SLM or the location of a projected image of the SLM as seen by an elemental hologram in a printer without a voxel-control lens. Such a voxel-control lens 500 and geometrical layout will effectively reconstruct the SLM 120 at an infinite distance relative to holographic recording material 70. If the size of the pixels 95 on a SLM 90 are small compared to the size of the elemental holograms 110, the voxel 140 boundary lines for such an embodiment will no longer intersect close to the holographic recording material 70 as depicted in FIG. 6, but instead become approximately parallel lines which extend out to a great distance without intersecting as shown in FIG. 11.

Although the characteristics of a voxel-control lens 500 may depend on the desired results, typically it is desirable for the voxel-control lens 500 to be achromatic and have an f-number of around 3.0 or lower. In one particular embodiment, the voxel-control lens may be achromatic and have an f-number of 2.4. In other embodiments, the voxel-control lens may have lower f-numbers, such as 0.5. Lower f-numbers are desirable because they allow for a wider angle of view. In yet other embodiments, the voxel-control lens may be monochromatic.

Figure 12:
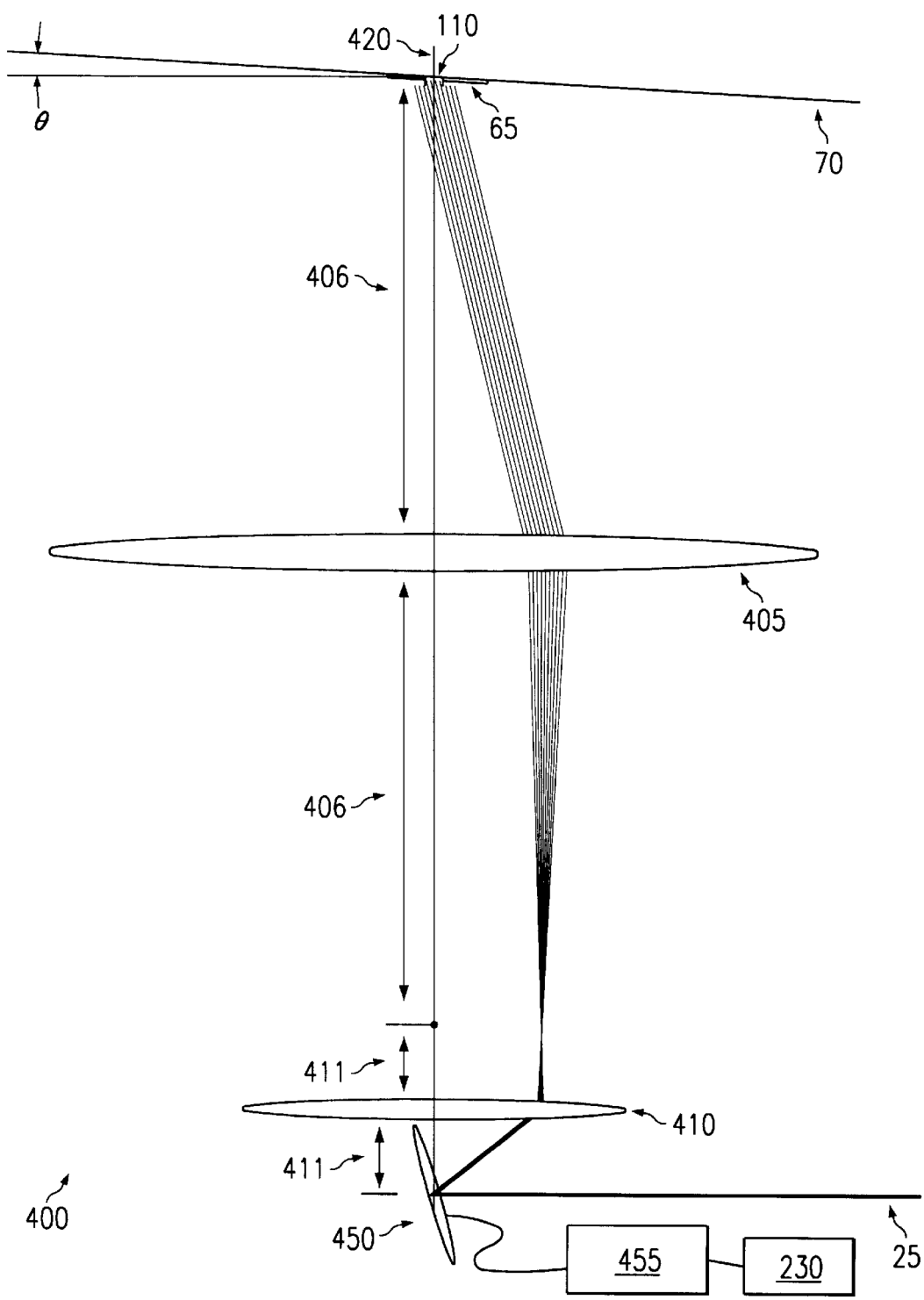
FIG. 12 is a schematic illustration of an embodiment of the reference beam-steering system.

FIG. 12 depicts yet another embodiment of a printer. Referring to FIGS. 12–16, a reference beam-steering system, generally 400, may use a beam-steering mirror system 450 to direct a reference beam 25, through a first beam-steering lens 410 and a second beam-steering lens 405 to an elemental hologram 110 on a holographic recording material 70 which, if desired, may be inclined with respect to the normal to the center axis 420.

Figure 15:
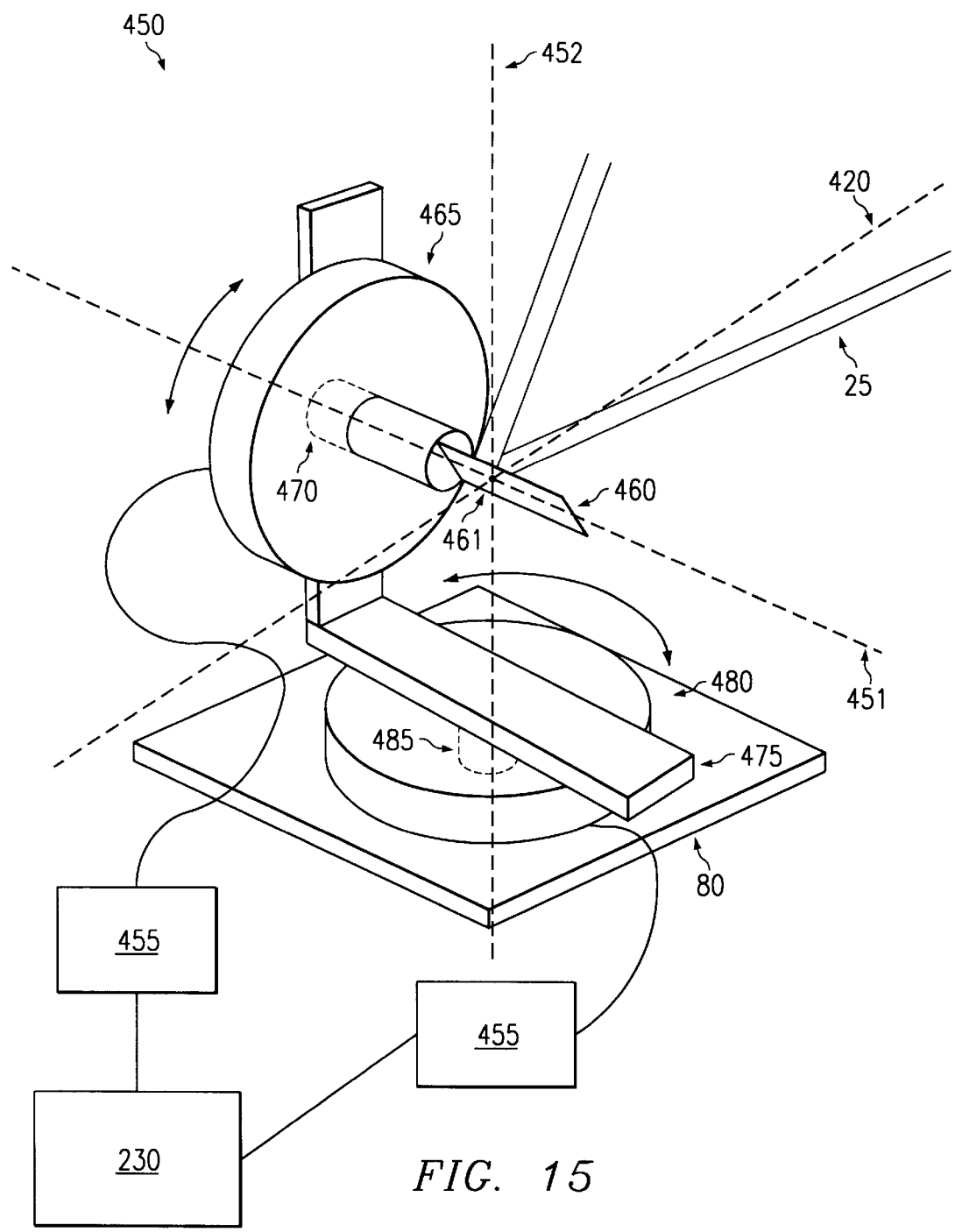
FIG. 15 is an isometric-view illustration of an embodiment of the beam-steering mirror system.

The beam-steering mirror system, generally 450, may be embodied in various ways. One particular embodiment is depicted in FIG. 15. In FIG. 15, a deflection mirror 460 is fixedly mounted to a first rotatable mount 465, such that when the first rotatable mount 465 rotates, the deflection mirror 460 rotates about a first axis 451 which passes through center point 461 of the deflection mirror 460. A motor for the first rotatable mount 470, which is controlled by a motor controller 455, rotates the first rotatable mount 465. The motor for the first rotatable mount 470 is fixedly attached to a support 475. First rotatable mount 465 is rotatably mounted to a support 475 with bearings or bushings to allow the first rotatable mount 465 to rotate about the first axis 451. Support 475 is fixedly mounted by an attaching device on a second rotatable mount 480 such that when the second rotatable mount 480 rotates, the deflection mirror 460 rotates about a second axis 452 which passes through the center point 461 of the deflection mirror 460 and which is orthogonal to the first axis 451. A motor for the second rotatable mount 485, which is controlled by a motor controller 455, rotates the second rotatable mount 480. The motor for the second rotatable mount may be fixedly attached to a vibration isolation table 80. The motors for the first and second rotatable mounts, 470 and 485, may be, but are not limited to, stepper motors or DC servo motors. The same or a separate motor controller 455 controlled by computer 230 may control the motors for the first and second rotatable mounts 470 and 480.

Figure 16:
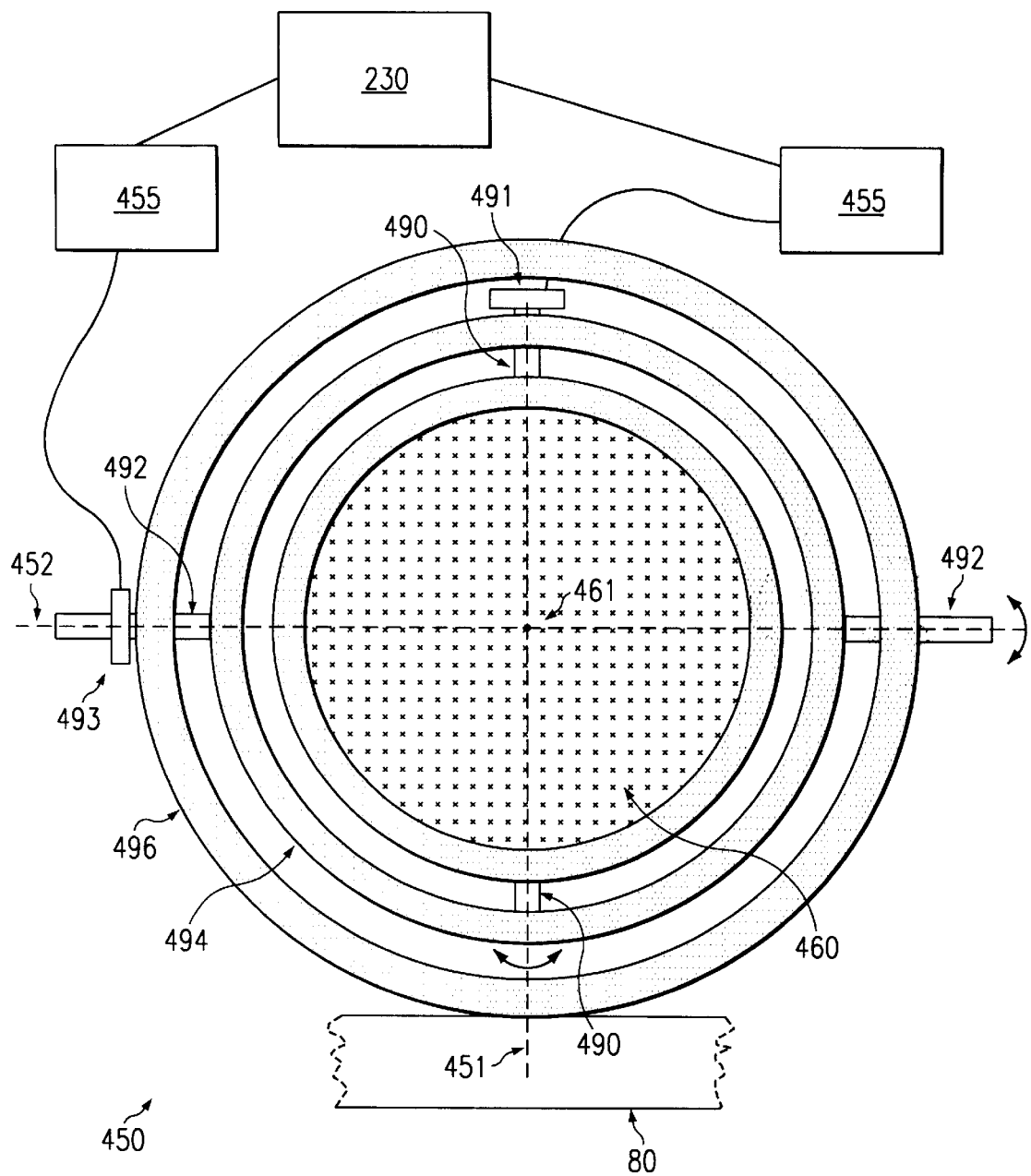
FIG. 16 is a front-view illustration of another embodiment of the beam-steering mirror system.

Another embodiment of a beam-steering mirror system 450 is a deflection mirror attached to a gimbal mount. In FIG. 16, a deflection mirror 460 is fixedly mounted to a first axle 490 such that the deflection mirror 460 rotates about a first axis 451 which passes through the center point 461 of the deflection mirror 460. First axle 490 is rotated by a motor 491 for the first axle which is controlled by a motor controller 455. The motor 491 for the first axle is fixedly attached to a first gimbal mount 494. First axle 490 is rotatably mounted by bearing or bushing to the first gimbal mount 494. The first gimbal mount 494 is fixedly mounted by an attaching device to a second axle 492 at the opposite ends of a diameter of the first gimbal mount 494 that coincides with a second axis 452. Second axle 492 is rotated by a motor 493 for the second axle and is controlled by a motor controller 455. The deflection mirror 460 rotates about the second axis 452 which passes through the center point 461 of the deflection mirror 460 and which is orthogonal to the first axis 451. Second axle 492 is rotatably mounted by bearing or bushing to a second gimbal mount 496. The motors 491 and 493, for the first and second axles, 491 and 493, may be, but are not limited to, stepper motors or DC servo motors. The same or separate motor controllers 455, controlled by a computer 230, may control the motors for the first and second axles, 491 and 493.

As shown in FIGS. 12–16, the center axis 420 of the beam-steering lenses 405, 410 intersects the first axis 451 and the second axis 452 and passes through the center of an elemental hologram. A reference beam 25 may be directed at the center point 461 of the deflection mirror 460. A computer 230 controls the mirror system motor controller or controllers 455 of the beam-steering mirror system 450, such that a reference beam 25 reflected off the deflection mirror 460 hits an elemental hologram 110 on a holographic recording material 70 at a desired angle. The deflection mirror 460 may be placed at a distance of one focal length 411 of the first beam-steering lens away from a first beam-steering lens 410. The first beam-steering lens 410 may be placed at a distance of the sum of the focal length 411 of the first beam-steering lens and the focal length 406 of the second beam-steering lens away from the second beam-steering lens 405. The second beam-steering lens 405 may be placed at a distance of one focal length 406 of the second beam-steering lens, away from the holographic recording material 70. The beam-steering system 400 of the present embodiment allows the reference beam 25 to be steered to intersect with elemental holograms 110 at different angles.

Figure 13:
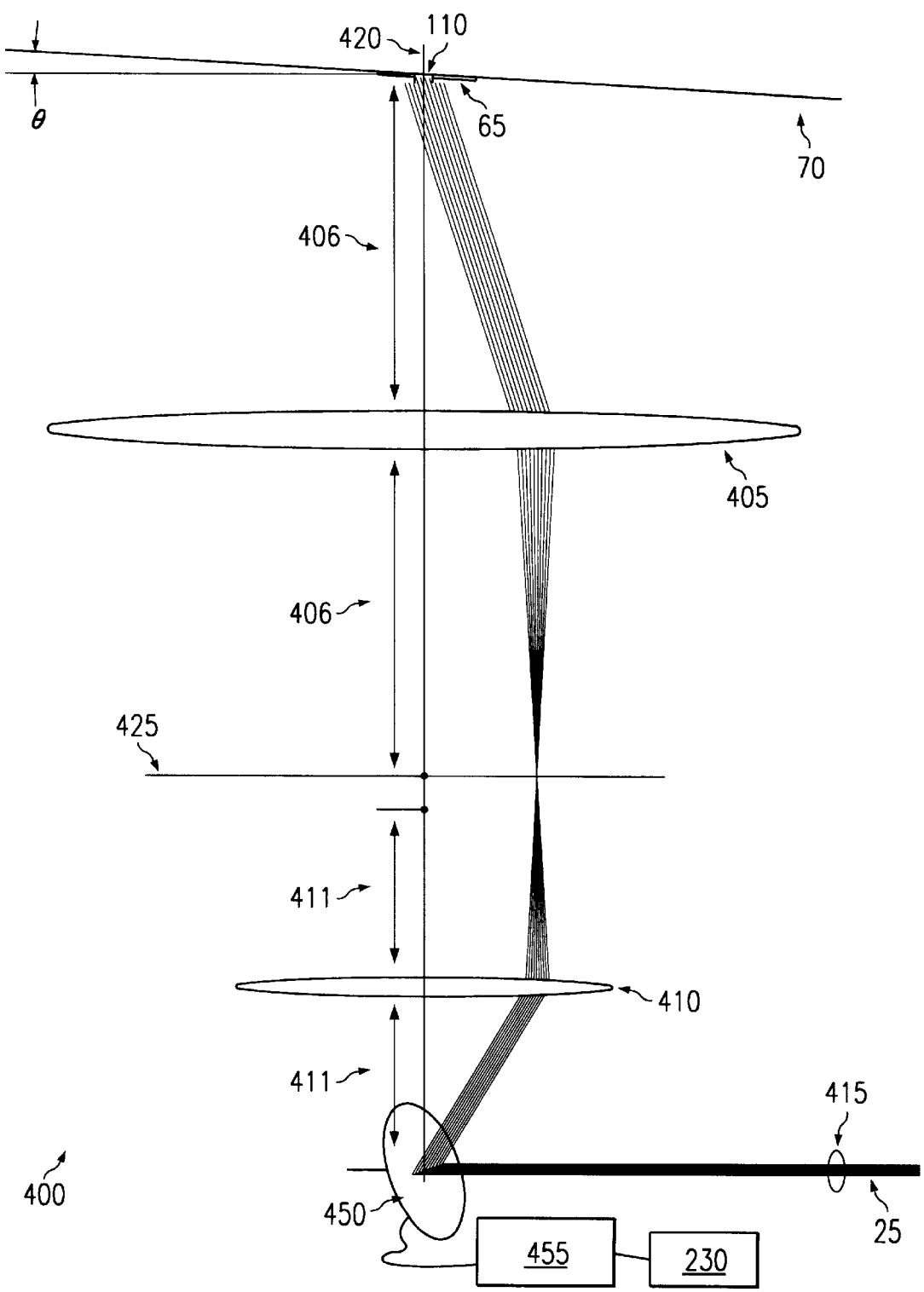
FIG. 13 is a schematic illustration of another embodiment of the reference beam-steering system.

In another embodiment, depicted in FIG. 13, the beam-steering system 400 may include a reference-beam converging lens 415 which may be achromatic or monochromatic. After a reference beam 25 passes through the reference-beam converging lens 415, the reference beam 25 is reflected by a beam-steering mirror system 450 before passing through beam-steering lenses 410 and 405. The first and second beam-steering lenses 410, 405 are placed such that the reference beam 25 that passes through the converging lens and the first beam-steering lens 410 converges in the focal plane 425 of the second beam-steering lens 405. In addition, the center point 461 shown in FIGS. 15 and 16 of a deflection mirror 460 shown in FIGS. 15 and 16 is located at a distance of one focal length 411 of the first beam-steering lens from the first beam-steering lens 410. Furthermore, the elemental hologram 110 to be exposed is located at a distance of one focal length of the second beam-steering lens 406 away from the second beam-steering lens 305.

Figure 14:
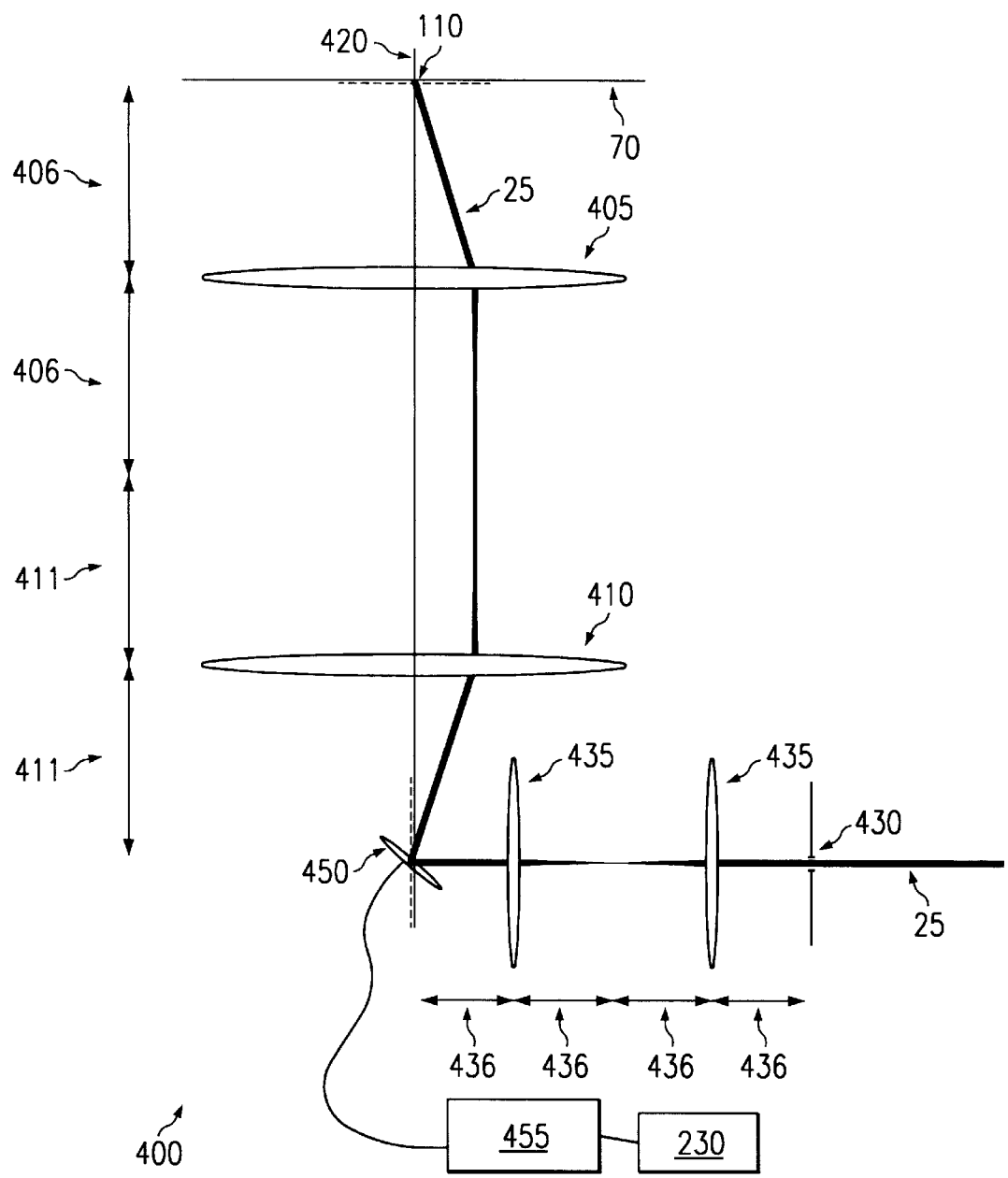
FIG. 14 is a schematic illustration of an embodiment of the reference beam-steering system that utilizes a beam-steering aperture.

In another embodiment, depicted in FIG. 14, the beam steering system 400 may include a beam-steering aperture 430 which eliminates the need to have a reference beam masking plate. In an embodiment, a reference beam 25 passes through a beam-steering aperture 430 that has the aperture of the area of the elemental hologram 110 to be exposed. If the reference beam passes through lenses that magnify or minify it, then the beam-steering aperture 430 should be sized such that the cross-section of the reference beam that intersects the elemental hologram to be exposed has the same size and shape of the elemental hologram. The reference beam 25 then passes through two aperture relay lenses 435, is reflected off of a deflection mirror 460 (shown in FIGS. 15 and 16) of the beam-steering mirror system 450, passes through the first beam-steering lens 410, passes through the second beam-steering lens 405, and then intersects the elemental hologram 110 to be exposed. The beam-steering aperture 430 is placed at a distance of one focal length 436 of the aperture relay lenses from one aperture relay lens 435. The aperture relay lenses 435 are located two focal lengths 436 of the aperture relay lens away from each other. Then the center point 461 (shown in FIGS. 15 and 16) of the deflection mirror 460 (shown in FIGS. 15 and 16) is located at a distance of one focal length 436 of the aperture relay lens away from the second aperture lens 435 that the reference beam passes through.

Figure 17:
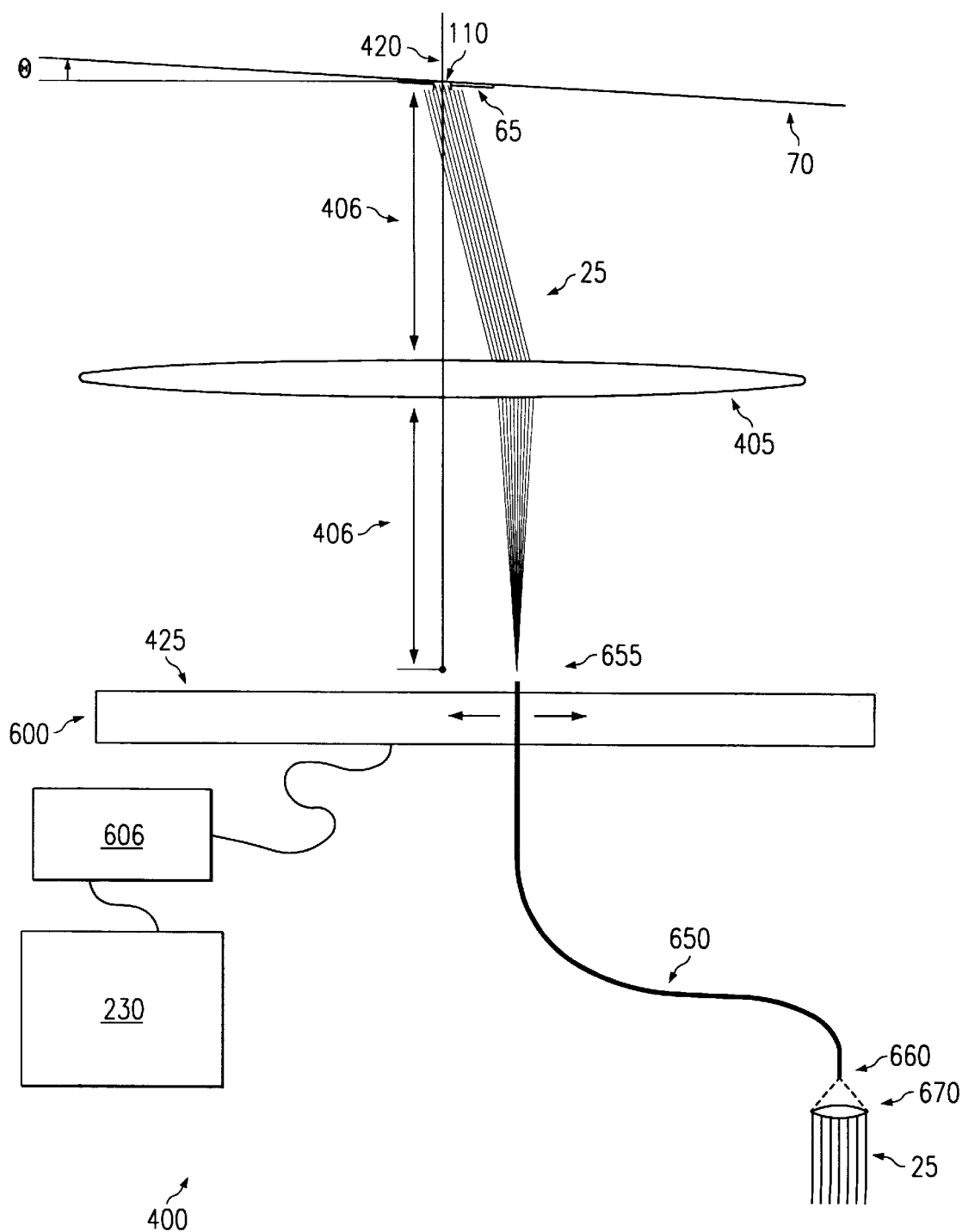
FIG. 17 is a schematic illustration of an embodiment of the reference beam-steering system that utilizes fiber optics and a translation system.
Figure 18:
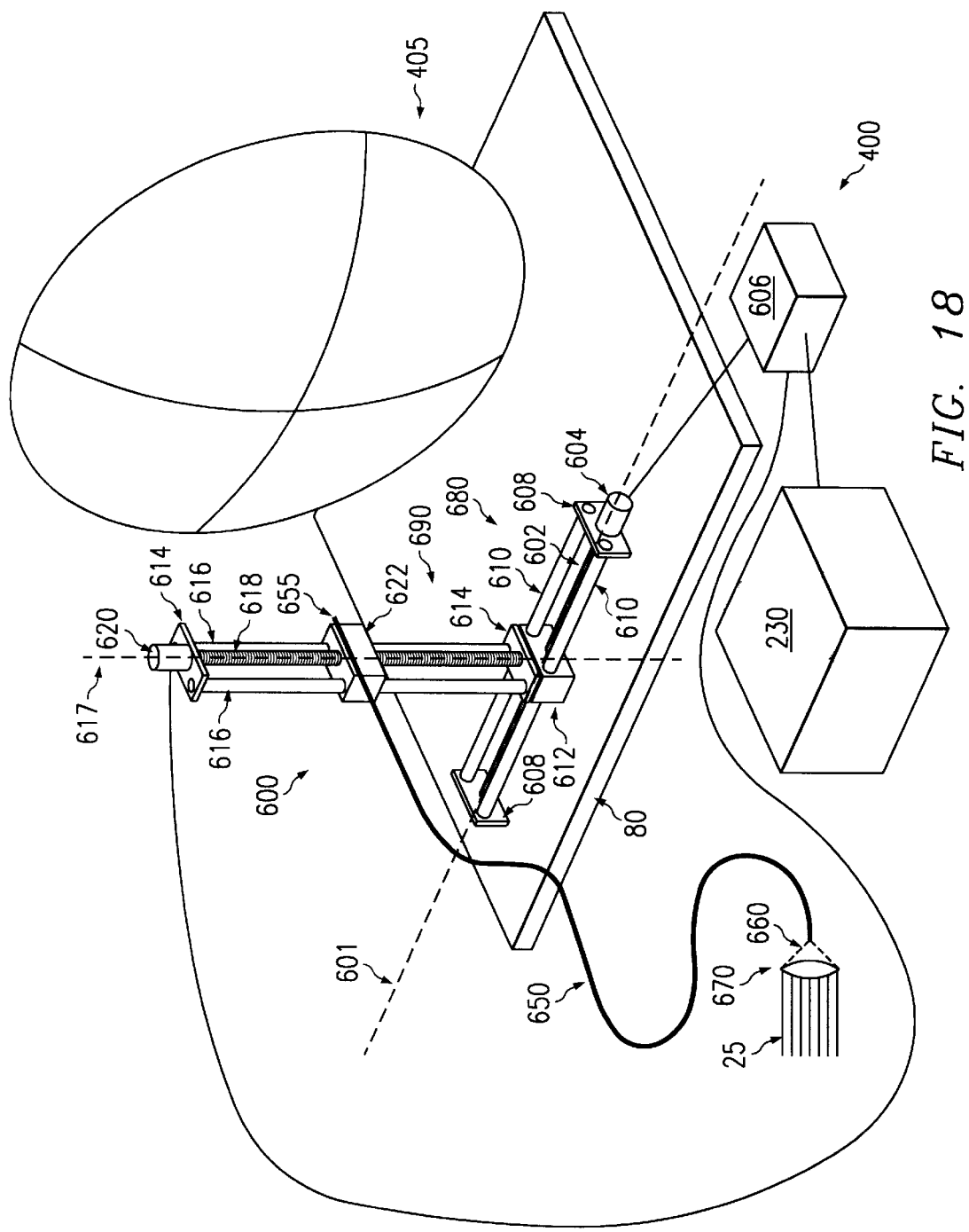
FIG. 18 is a simplified, isometric-view illustration of an embodiment of the reference beam-steering system that utilizes fiber optics and a translation system.
Figure 21:
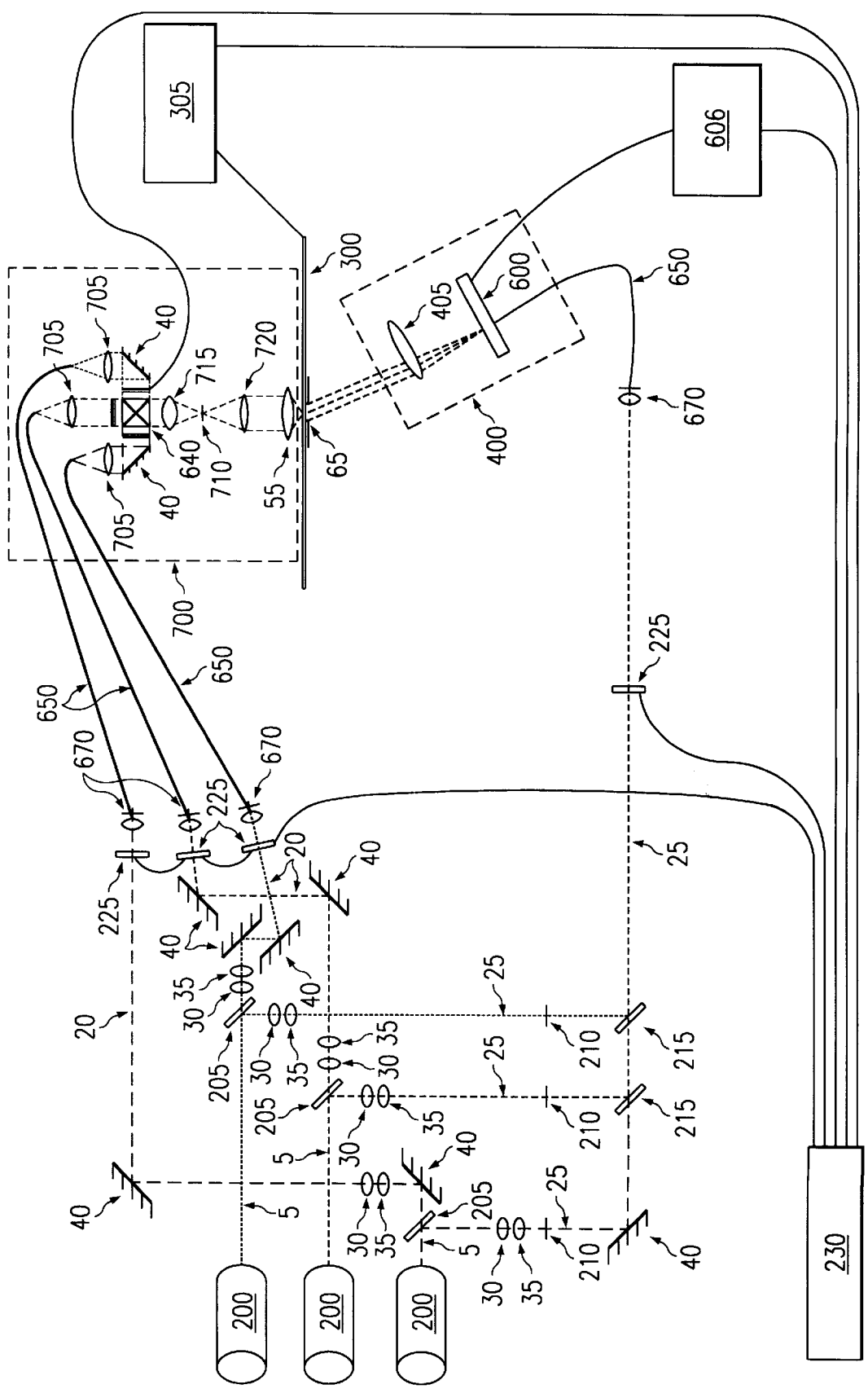
FIG. 21 is a top-view, schematic drawing of one embodiment, which utilizes fiber optics, for a one-step, full-color, full-parallax printer for holographic stereograms.

Another embodiment of a reference beam-steering system 400 is illustrated by FIGS. 17, 18, and 21. In this embodiment, an optical coupler lens 670 channels a reference beam 25 that has just passed through a beam shutter to the fiber optic end 660 of a fiber optic cable 650. The fiber optic cable 650 delivers the reference beam 25 to a fiber optic tip 655 which is placed in the focal plane 425 of a second beam-steering lens 405. The reference beam 25 passes through a beam-steering lens 405 to an elemental hologram 110. The beam-steering lens 405 is located at a distance of one focal length 406 of the second beam-steering lens from the elemental hologram 110 being exposed. The fiber optic tip 655 is translated by a translation system, generally 600.

Figure 19:
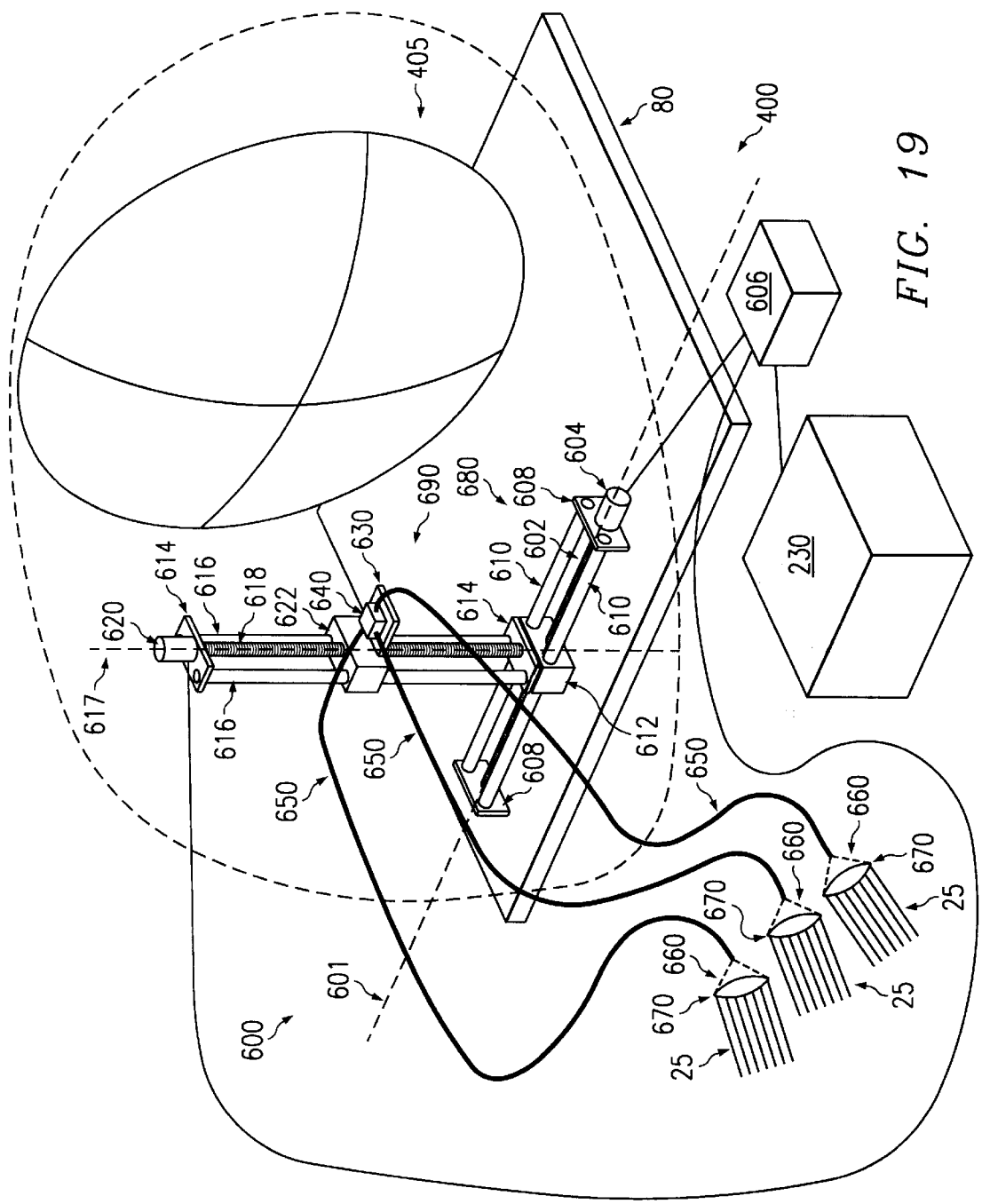
FIG. 19 is a simplified, isometric-view illustration of an embodiment of a reference beam-steering system that utilizes fiber optics, a translation system, and a optical combiner unit.

FIG. 19 illustrates another embodiment of the reference beam-steering system 400. In this embodiment, three reference beams 25 which may each be a different color are channeled by three optical coupler lenses 670 toward three fiber optic ends 660 of three fiber optic cables 650. The fiber optic cables 650 deliver the reference beams 25 to fiber optic tips 655 to direct the reference beams 25 into optical combiner unit 640. Optical combiner unit 640 may have two dichroic combiners 215, which may combine the three reference beams 25 into a single reference beam 25. The optical combiner unit 640 is placed in the focal plane 425 (shown in FIG. 17) of a beam-steering lens 405. The single reference beam 25 from the optical combiner unit 640 passes through the beam-steering lens 405 to an elemental hologram 110. The beam-steering lens 405 is located at a distance of one focal length 406 of the beam-steering lens from the elemental hologram 110 being exposed. The optical combiner unit 640 is fixedly mounted to a platform 630 which is fixedly mounted to a second movable support 622.

In another embodiment, three reference beams 25 are transmitted by fiber optic cables 650 to a optical combiner unit 640. The single reference beam 25 that is output from the optical combiner unit 640 is channeled by an optical coupler lens 670 into a single fiber optic cable 650 which is attached to and carried by an attaching device to a translation system 600. The fiber optic tip 655 of the single fiber optic cable 650 is located in a focal plane 425 of a beam-steering lens 405.

In still another embodiment, the three reference beams 25 are transmitted by fiber optic cables 650 to a optical combiner unit 640. The single reference beam 25 that is output from the optical combiner unit 640 passes through a beam shutter 225 before it is channeled by an optical coupler lens 670 into a single fiber optic cable 650 which is fixedly attached to a translation system 600. The fiber optic tip 655 of the fiber optic cable 650 is located in a focal plane 425 of a beam-steering lens 405.

The translation system 600, as depicted in FIG. 18 and FIG. 19, is able to translate in two orthogonal directions. The translation system includes a x-translation stage and a y-translation stage.

One illustrative embodiment of a x-translation stage 680 includes a first lead screw 602 which is rotatably mounted by bushing, bearing, or other rotatable means to first end plates 608, and which may be rotated about the axis 601 of the first lead screw by a motor 604 for the first lead screw which is fixedly mounted to one of the first end plates 608. Two first guide bars 610 are fixedly mounted to the first end plates 608 such that the first guide bars 610 lie parallel to the axis of the first lead screw 601. The two first guide bars 610 pass through two holes in a first movable support 612. The first lead screw 602 is threaded through a hole in the first movable support 612. Thus, in this embodiment of the x-translation stage 680, when the first lead screw 602 is rotated by the motor 604 for the first lead screw, the first movable support 612 will move along the axis 601 of the first lead screw.

One illustrative embodiment of a y-translation stage 680 includes a second lead screw 618 which is rotatably mounted by bushing, bearing, or other rotatable means to second end plates 614, and which may be rotated about the axis 617 of the second lead screw 618 by a motor 620 for the second lead screw which is mounted to one of the second end plates 614. The other of the second end plates 614 is mounted to the first movable support 612 such that the axis 617 of the second lead screw is orthogonal to the axis 601 of the first lead screw. Two second guide bars 616 are fixedly mounted to the second end plates 614 such that the second guide bars 616 lie parallel to the axis 617 of the second lead screw. The two second guide bars 616 pass through two holes in a second movable support 622. The second lead screw 618 is threaded through a hole in the second movable support 622. Thus, in this embodiment of the y-translation device 690, when the second lead screw 618 is rotated by the motor for the second lead screw 620, the second movable support 622 will move along the axis 617 of the second lead screw.

The motors 604 and 620, for the first and second lead screws which may be, but are not limited to stepper, DC servo or linear motors, may be controlled by a motor controller 606 for the motors for the lead screws which may be controlled by computer 230.

Although the types, focal lengths, and number of beam-steering lenses may be varied, for some embodiments, it may be desirable for the beam-steering lenses to be achromatic and have f-numbers of around 3.0 or less. In other embodiments, it may be desirable for the beam-steering lenses to be achromatic, confocal, f-θ lenses, which are also known as flat-field laser-scan lenses. In some embodiments, it may also be desirable to have lenses of lower f-number to allow for a wider range of reference beams. In one particular embodiment, it may be desirable to have the beam-steering lenses be achromatic and have f-numbers of around 1.0. In addition, the beam-steering lenses may be monochromatic in other embodiments.

The beam-steering system may be utilized to create holographic stereograms that display a particular image when illuminated by an illumination source from one angle, but display another image when illuminated by an illumination source from another angle. For instance, after exposing an elemental hologram with an object beam conditioned with a particular image on an SLM and a reference beam at a particular angle, the elemental hologram may then be exposed to an object beam conditioned with another image on the SLM and a reference beam at another angle. In addition, a set of elemental holograms on a holographic recording material may be exposed by a reference beam at a particular angle, while another set of elemental holograms may be exposed by a reference beam at another angle. Thus, a printer of this invention can create a holographic stereogram that displays a different image depending on the angle of the illumination source. Furthermore, the same printer with a beam-steering system may be used to create multiple holographic stereograms, each with a different reference angle, such that the images of each will only appear when illuminated by an illumination source at the correct angle. If such multiple holographic stereograms are mounted on top of each other, then different images may be displayed by simply changing the angle at which the illumination source intersects the holographic recording materials.

Figure 20:
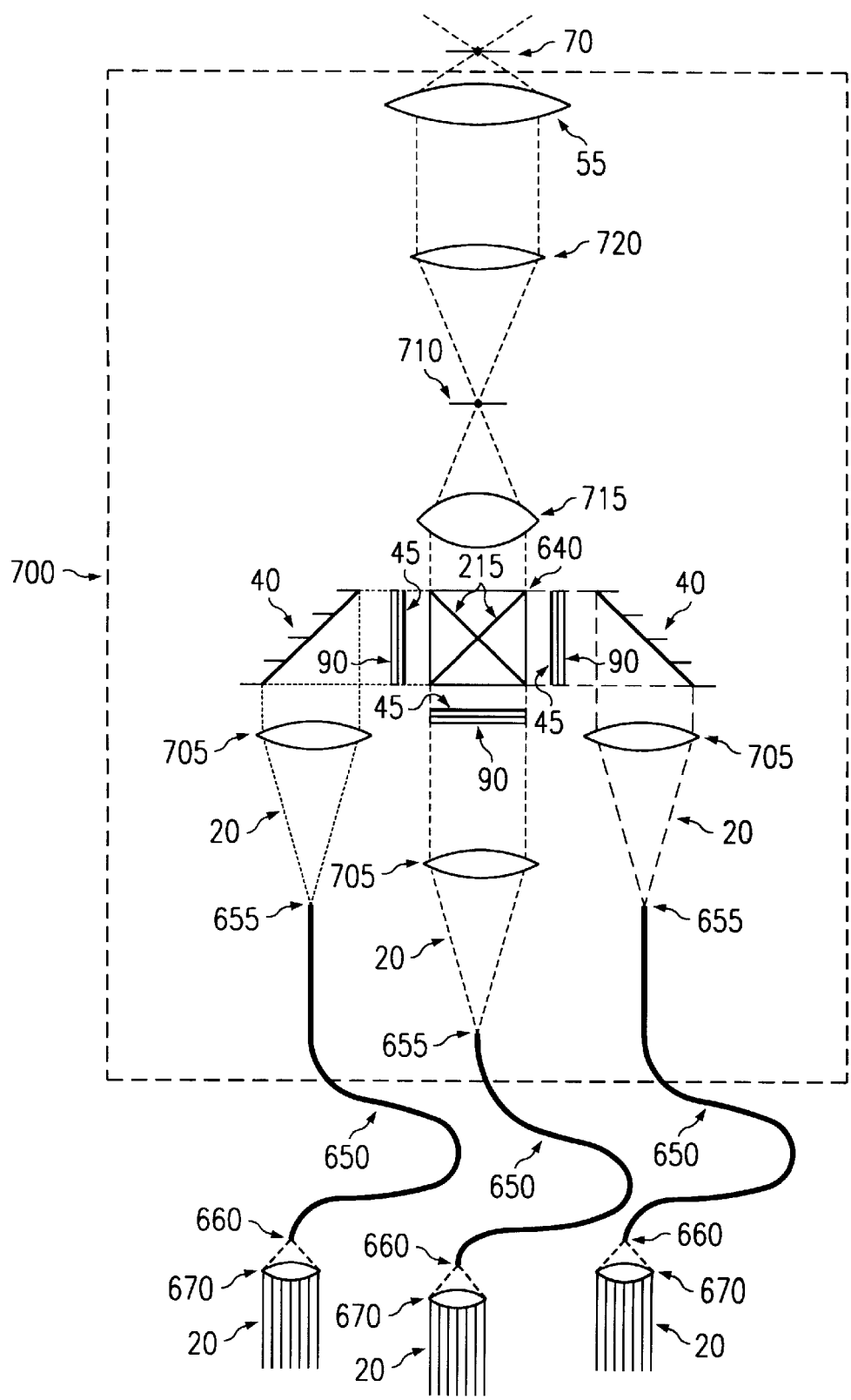
FIG. 20 is a schematic illustration of an object beam unit that utilizes fiber optics.

Another embodiment, illustrated by FIG. 20, utilizes multiple SLMs 90 to produce full-color holographic stereograms. In FIG. 20, two dichroic combiners 215 in an "x" configuration, or other suitable optical combiners, may be used in combination with three object beams 20, one object beam being red light, the other green light, and the other blue light. The three object beams 20 may be directed through three separate gray-scale SLMs 90. In one embodiment the SLMs are LCD panels of high resolution such as 1,280×1,024 pixels where the total size of the LCD panel is approximately 10 cm×10 cm. However, smaller LCD panels may be used. For instance, LCD panels with the same or fewer number of pixels but that are around 2 cm×2 cm in size or smaller may be used.

In an embodiment shown in FIG. 20 and FIG. 21, after passing through beam shutters 225, object beams 20 are directed through optical coupler lenses 670 to converge at fiber optic ends 660. The object beams 20 are then transmitted by fiber optic cables 650 to the fiber optic tips 655 which are placed in the focal planes of singlet lenses 705. The object beams 20 may pass through the singlet lenses 705, if necessary, reflect off mirrors 40, and pass through SLMs 90 and band-limited diffusers 45, which may be color specific. The singlet lenses 705 expand and collimate the object beams 20 such that the object beams 20 may more evenly illuminate the SLMs 90. The object beams 20 are then directed through a optical combiner unit 640 that may use two dichroic combiners 215 in an "x" configuration, or other suitable optical combiners, to combine the three object beams 20 into a single beam. The single object beam 20 may then pass through a first projection lens 715 and a Fourier transform filter 710 that may remove undesired effects such as, but not limited to, high frequency image components such as pixel or grid artifacts that resulted from an SLM display with pixels. The object beam 20 may then pass through a second projection lens 720 and then a converging lens 55. The first projection lens 715 is located such that images of the SLMs all lie in the focal plane of the first projection lens. The Fourier transform filter 710 is located in the focal planes of both the first projection lens and the second projection lens. The converging lens 55 is located such that its focal plane intersects the holographic recording material 70 at the elemental hologram 110 to be exposed. In other embodiments of the object beam unit 700, the first and second projection lenses 715 and 720 and the Fourier transform filter 710 are not used. In still other embodiments of the object beam unit 700, a voxel control lens 500 may be included in the object beam unit 700 and lie in close proximity to the holographic recording material 70.

In one embodiments a material holder, generally 300, may be used to translate holographic recording material 70. As depicted in FIGS. 22–25, a material holder 300 may include a frame 324 attached to a x-translation stage 680 that is attached to a y-translation stage 690.

An embodiment of the y-translation stage 680, as depicted in FIGS. 22–25, may have first holder end plates 302 to which first holder guide rods 306 are fixedly attached. A first holder lead screw 308 and a first holder driven lead screw 309 are rotatably attached by bushing or bearing or other suitable means to the first holder end plates 302. The first holder lead screw 308 and the first holder guide rods 306 are parallel to the axis of the first holder driven lead screw 307. The first holder driven lead screw 309 may be rotated by a motor 310 for the first holder driven lead screw, which is controlled by holder motor controller 305, which is controlled by computer 230. The motor 310 may also drive both lead screws 308 and 309 with a timing belt or other linkage. In addition, two motors 310, each coupled to a lead screw, may drive the lead screws. The first holder driven lead screw 309 passes through a threaded hole in a first holder movable support 312. The two first holder guide rods 306 in close proximity to the first holder driven lead screw 309 pass through holes in the same first holder movable support 312. The first holder lead screw 308 passes through a threaded hole in another first holder movable support 312, and the two first holder guide rods 306 in close proximity to the first holder lead screw 308 pass through holes in the same first holder movable support 312.

An embodiment of the x-translation stage 680, as depicted in FIGS. 22–26, may have a second holder lead screw 318 and a first holder driven lead screw 319 rotatably attached by bushing or bearing or other suitable means to second holder end plates 314. The axis of the second holder driven lead screw 317 is orthogonal to the axis of the first holder driven lead screw 307. The second holder lead screw 318 and the second holder guide rods 316 are parallel to the axis of the second holder driven lead screw 317. The second holder driven lead screw 319 may be rotated by a motor 320, for the second holder driven lead screw which is controlled by holder motor controller 305, which is controlled by computer 230. The second holder driven lead screw 319 passes through a threaded hole in a second holder movable support 322. The two second holder guide rods 316 in close proximity to the second holder driven lead screw 319 pass through holes in the same second holder movable support 322. The second holder lead screw 318 passes through a threaded hole in another second holder movable support 322, and the two second holder guide rods 316 in close proximity to the second holder lead screw 318 pass through holes in the same second holder movable support 322.

Figure 22:
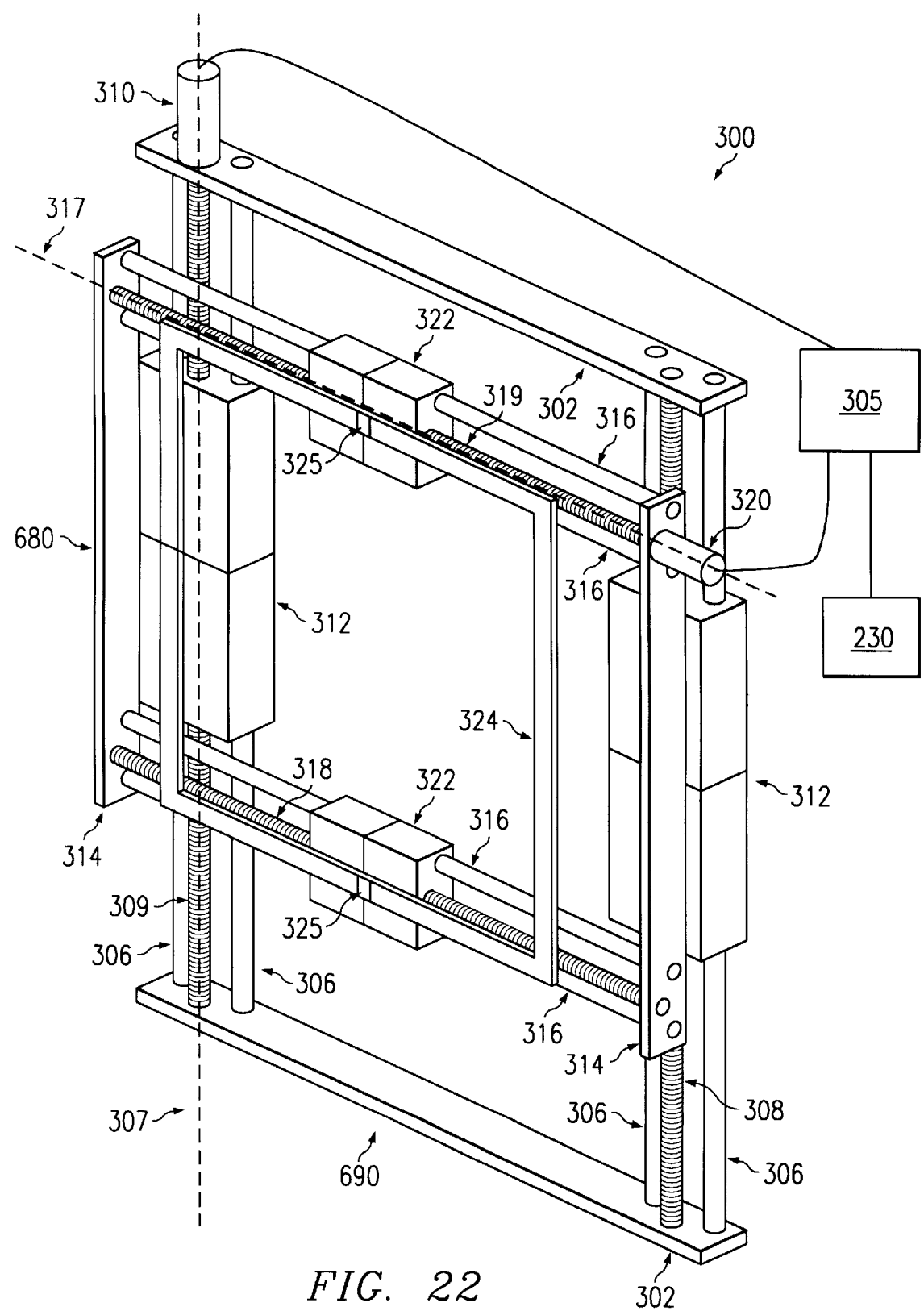
FIG. 22 is a simplified, isometric-view illustration of an embodiment of a material holder.
Figure 23:
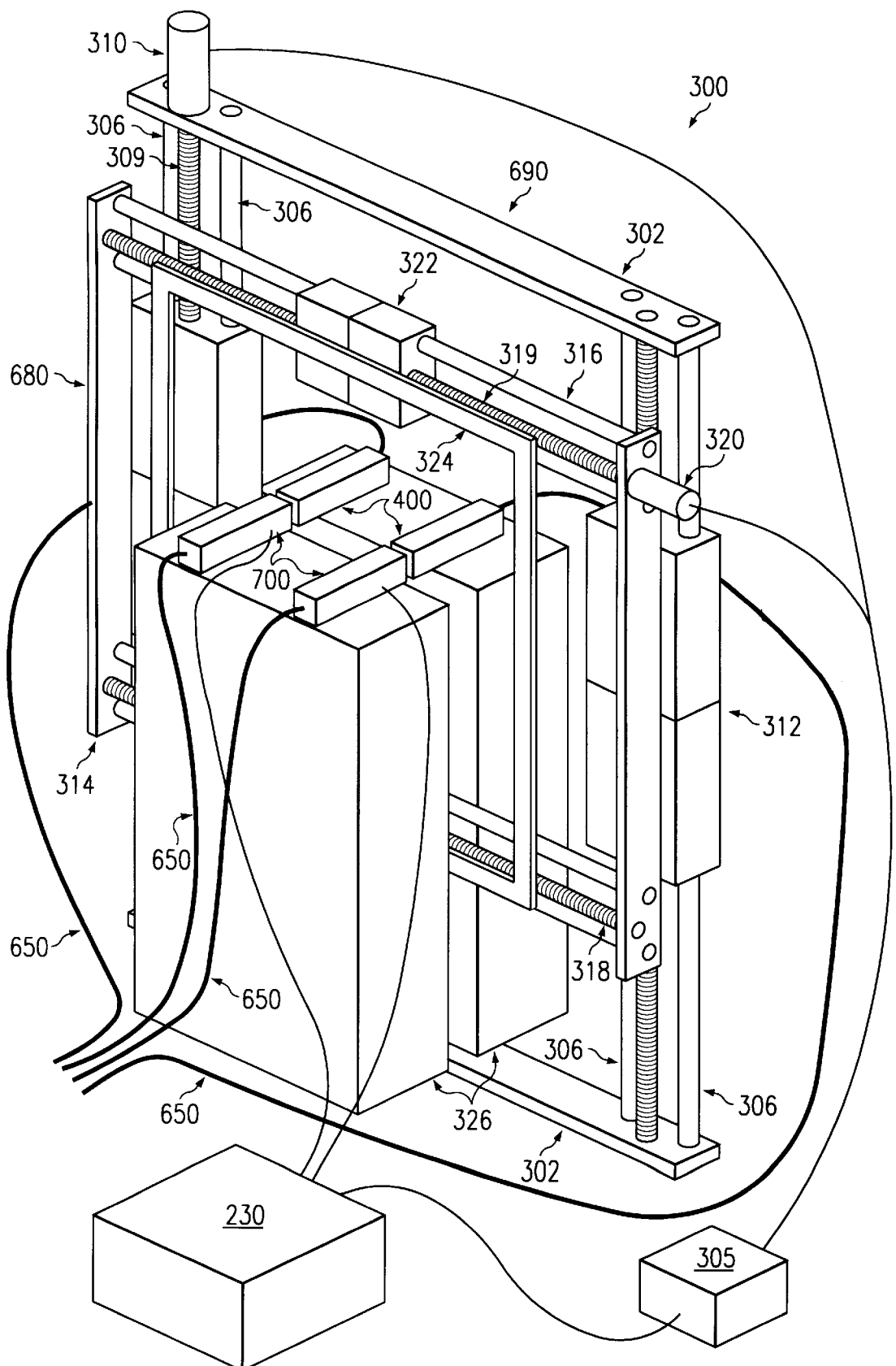
FIG. 23 is a schematic illustration of an embodiment of a printer with fixed object beam units and fixed reference beam-steering systems.

As depicted in FIGS. 22 and 23, the x-translation stage 680 may be mounted to the y-translation stage 690. In one embodiment, the first holder movable supports 312 are fixedly mounted to the second holder end plates 314. The second holder movable supports 322 are fixedly attached to a frame 324. A second frame 324 may be clamped to a first frame 324 by detachable couplings 325 which may include, but are not limited to, clamps, snaps, screws, and bolts. A holographic recording material may be held in between two detachably coupled frames 324. In an alternative embodiment, the natural adhesive property of a holographic recording material may hold the material on one side of a transparent plate that is secured to frames 324. The frames 324 may be composed of stress-relieved aluminum, titanium, composites, or other rigid, strong, and lightweight materials.

As illustrated in FIG. 23, object beam units 700 and reference beam-steering systems 400 may be fixed to bases 326.

Figure 24:
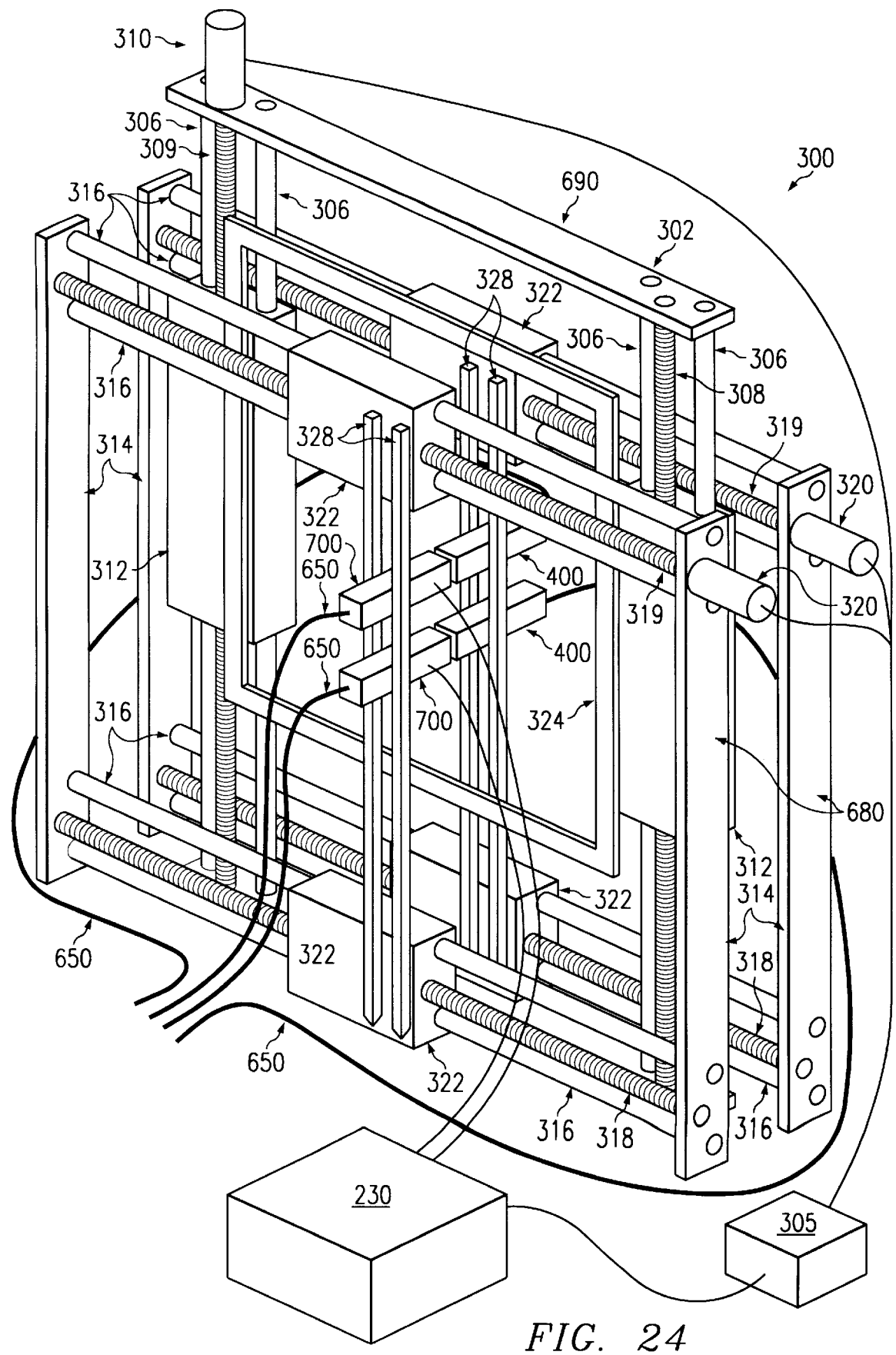
FIG. 24 is a schematic illustration of an embodiment of a printer with mobile object beam units and mobile reference beam-steering systems.
Figure 25:
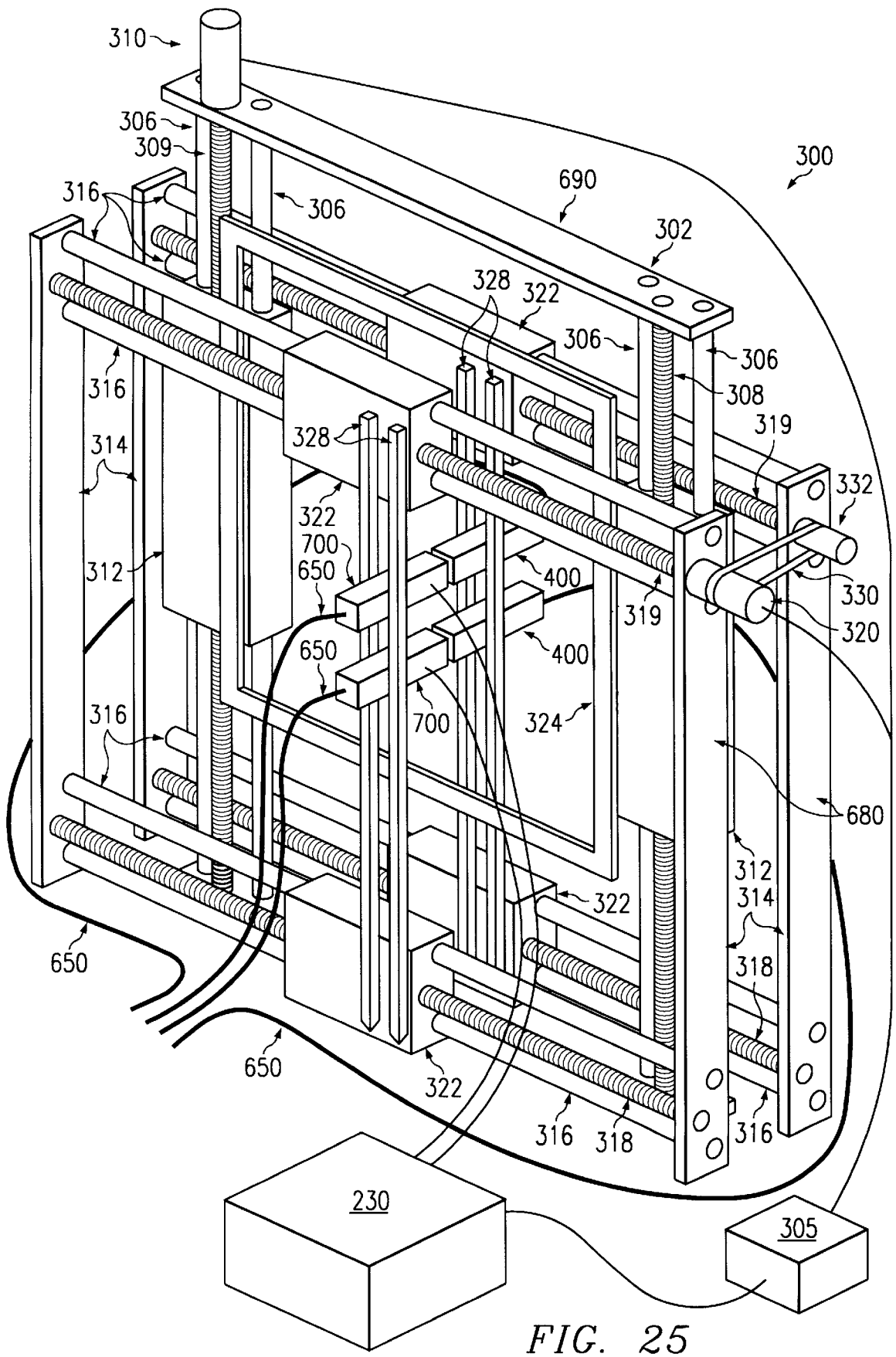
FIG. 25 is a schematic illustration of another embodiment of a printer with mobile object beam units and mobile reference beam-steering systems.

As illustrated in FIGS. 24 and 25, one or more object beam units 700 may be fixedly mounted to unit mounts 328 which are fixedly mounted to second holder movable supports 322 of a x-translation stage 680. Similarly, one or more reference beam-steering systems 400 may be fixedly mounted to other unit mounts 328 which are fixedly mounted to other second holder movable supports 322 of another x-translation stage 680. In addition, in some embodiments, a frame 324 may be fixed to the first movable supports 312 of a y-translation stage 690. Thus, in some embodiments, the holographic recording material 70 clamped between two frames 324 may translate vertically, while the object beam units 700 and reference beam-steering systems 400 translate horizontally.

In the embodiment depicted in FIG. 24, two motors 320, which are controlled by holder motor controller 305, drive the second holder driven lead screws 319 of the x-translation stages 680. In an alternative embodiment depicted in FIG. 25, one motor 320, in combination with a timing belt 330 that is linked to a belt mount 332 that is fixedly attached to one of the second holder driven lead screws 319, drives both second holder driven lead screws 319 of the x-translation stages 680.

Figure 26:
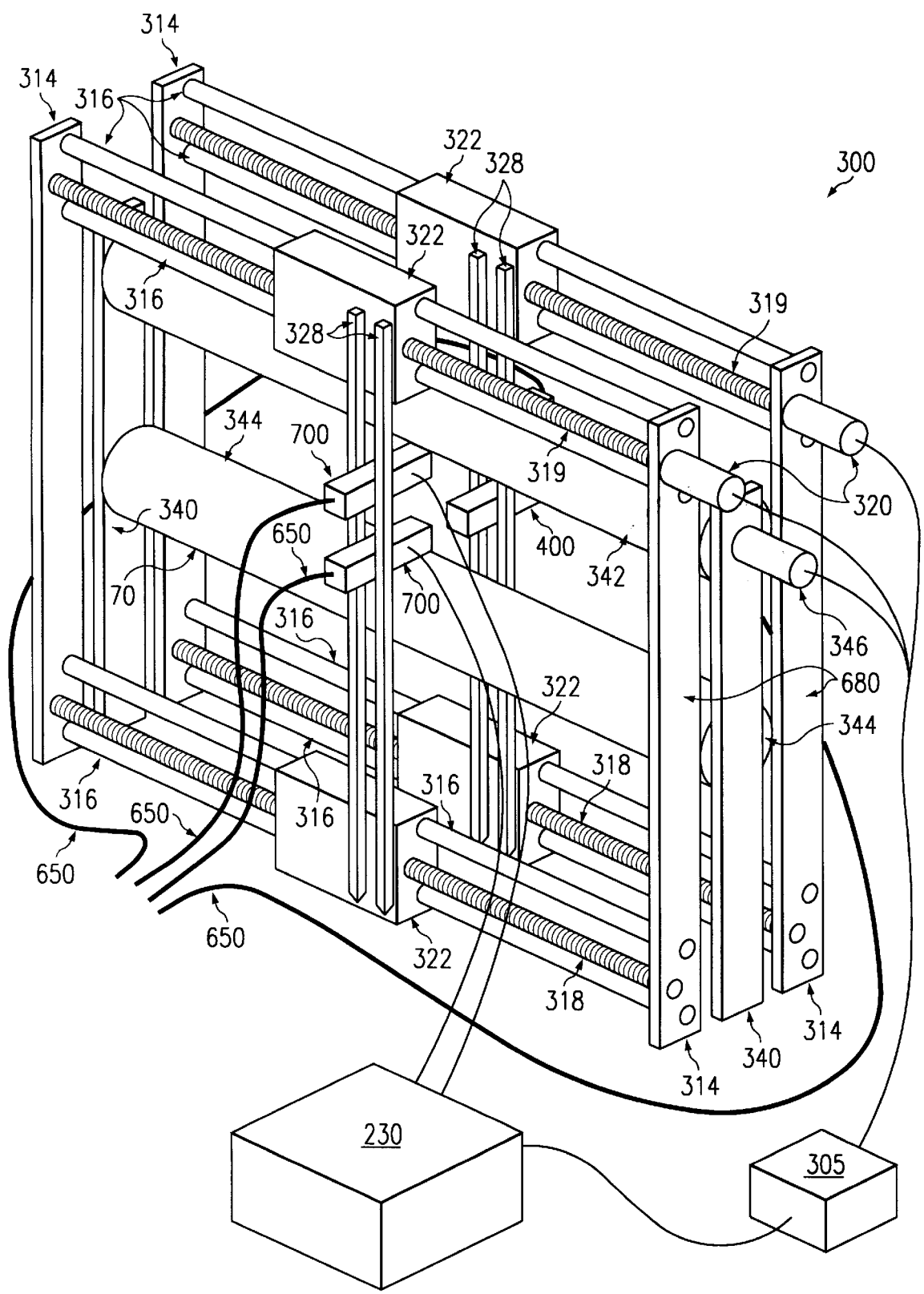
FIG. 26 is a schematic illustration of yet another embodiment of a printer with mobile object beam units and mobile reference beam-steering systems.

In another embodiment depicted in FIG. 26, the object beam units 700 and reference beam-steering systems 400 are attached to unit mounts 328 which are attached to the second holder movable supports 322 of x-translation stages 680. A holographic recording material 70 translates vertically by a y-axis roller system 350 with rollers 342 and 344. The holographic recording material 70 may be wrapped around a top roller 342 and a bottom roller 344. The top and bottom rollers 342 and 344 are rotatably mounted by bushing, bearing, or other suitable means between roller end plates 340. The top roller 342 may be rotated by a motor for the rollers 346, which is controlled by a motor controller 305 which is controlled by a computer 230.

The motors used in the various embodiments of the translation systems may be, but are not limited to stepper motors.

As depicted in FIGS. 23–26, there may be simultaneous or parallel printing of elemental holograms. In some embodiments, the printer may include object beam units and reference beam-steering systems attached to translation systems with x-translation stages that are attached to y-translation stages. In such systems, the holographic recording material may be fixed, while the object beam units and reference beam-steering systems are moved by the translation system to record an array of elemental holograms.

In an alternative embodiment, multiple layers of holographic recording material 70 may be held in a material holder 300. In addition, each layer may be sensitive to a particular wavelength of light.

Figure 27A:
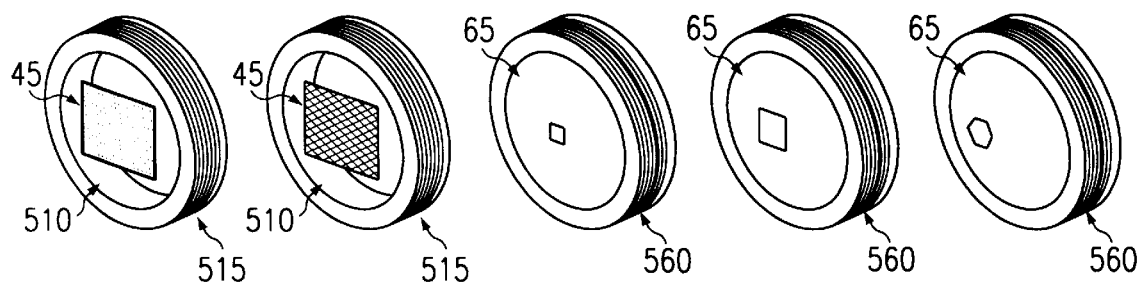
FIGS. 27(a), (b), and (c) are isometric-view illustrations of removable band-limited diffusers and removable reference beam masking plates.
Figure 27B:
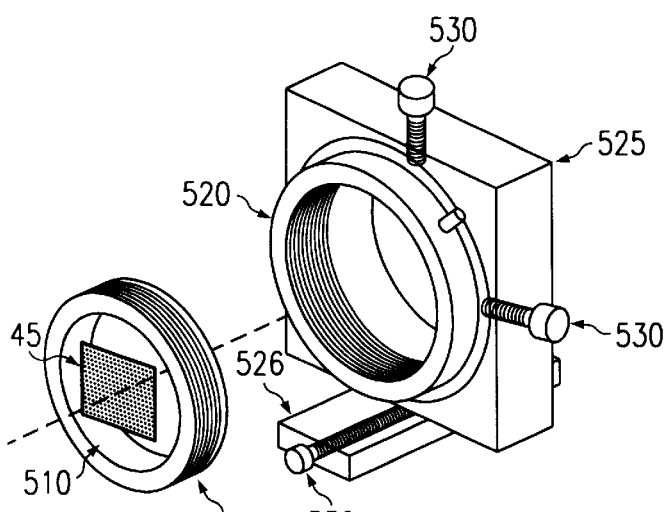
Figure 27C:
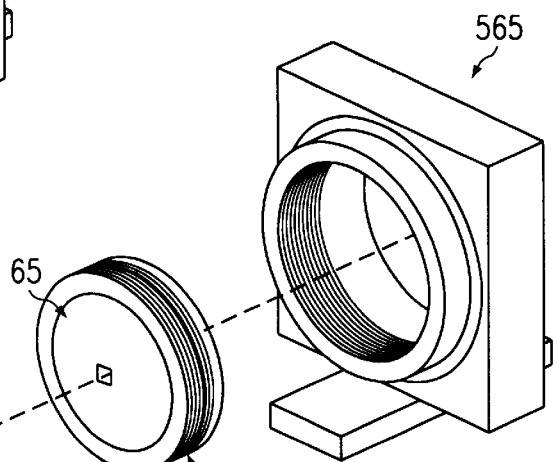

In another embodiment, for a given object beam, a matched set of a band-limited diffusers 45 and a reference beam masking plate 65 may be configured to allow for even exposure of an elemental hologram 110 of a particular size or shape and to prevent exposing portions of the holographic recording material 70 that are not part of the elemental hologram 110 intended to be exposed. As illustrated by FIGS. 27(a), (b), and (c), matched sets of band-limited diffusers 45 and reference beam masking plates 65 can be constructed to allow the exposure of elemental holograms 110 of different sizes or shapes. If the sets of band-limited diffusers 45 and reference beam masking plates 65 are constructed such that the band-limited diffusers 45 of all the sets have the same outer dimensions and can be placed in the same position in a hologram printer, and such that the reference beam masking plates 65 of all the sets have the same outer dimensions and can be placed in the same position in a hologram printer, then sets can be conveniently switched to easily change the size of the elemental hologram printed. Thus, a matched set of a band-limited diffuser 45 and a reference beam masking plate 65 can be replaced with another set of a band-limited diffuser 45 and a reference beam masking plate 65 so as to allow printing of a larger, smaller, or differently shaped elemental hologram. As depicted in FIG. 27(b), a band-limited diffuser 45 may be mounted onto a plate 510 housed in a threaded frame 515. The plate 510 may be a transparent sheet of glass with an anti-reflective coating. The threaded frame 515 may be threaded into positioning device 525 which has a base 526 and a threaded ring 520. The positioning device 520 may allow translational adjustment in three orthogonal directions by three adjustable screws 530. As depicted in FIG. 27(c), a reference beam masking plate 65 may be housed in a threaded plate frame 560. A threaded plate frame 560 may be threaded into a threaded positioning device 565.

Some examples of full-color embodiments are depicted in FIGS. 7, 8, 19, and 21. Another embodiment includes a full-color printer with three different colored lasers, optical combiners, such as but not limited to dichroic combiners, to combine the three beams from the lasers, a full-color SLM, and achromatic optics to print full-color holographic stereograms. Still another embodiment includes a color printer with three different colored lasers, an object beam unit that combines three object beams using three band-limited diffusers, three gray-scale SLMS, and an optical combiner, achromatic optics, such as achromatic lenses, to manipulate or condition the full-color beams produced by the printer, and an optical combiner to combine three reference beams into a combined, full-color, reference beam. Yet another embodiment includes a full-color printer with three different colored lasers, an object beam unit with an HOE that combines three different colored object beams into one combined, full-color, object beam and that also evenly distributes the combined object beam over an elemental hologram, an optical combiner to combine three reference beams into a combined, full-color, reference beam, and achromatic optics to manipulate or condition the full-colored beams.

Another aspect involves a method of creating animated, one-step, full-parallax, holographic stereograms. One embodiment involves using multiple or sub-divided viewing zones, which typically are not needed to produce static image, full-parallax holographic stereograms, to produce one-step, full-parallax, holographic stereograms that can display animated subjects or different images through different viewing zones. Viewing zones are typically planar areas located at a distance from the holographic recording material in which a viewer's eye looking through that plane could see the holographic image produced by an array of elemental holograms. Thus, a viewing zone may be analogous to a window in front of a hologram. However, rather than being planar, viewing zones may also be constructed from a series of points. Unlike traditional techniques for producing one-step, full-parallax holographic stereograms in which the view of a three-dimensional object or a scene is determined for each elemental hologram, the disclosed printer produces animated, one-step, full-parallax holographic stereograms by determining the view of an object or scene that an observer would see in each viewing zone.

Referring to FIGS. 28–31, and assuming that a voxel-control lens 500 is used such that the image 505 (shown in FIG. 10(b)) of an SLM would appear at an infinite distance from the surface of the holographic recording material, the steps for producing a holographic element of an animated holographic stereogram or a holographic stereogram that displays different images in different viewing zones are as follows.

Figure 29:
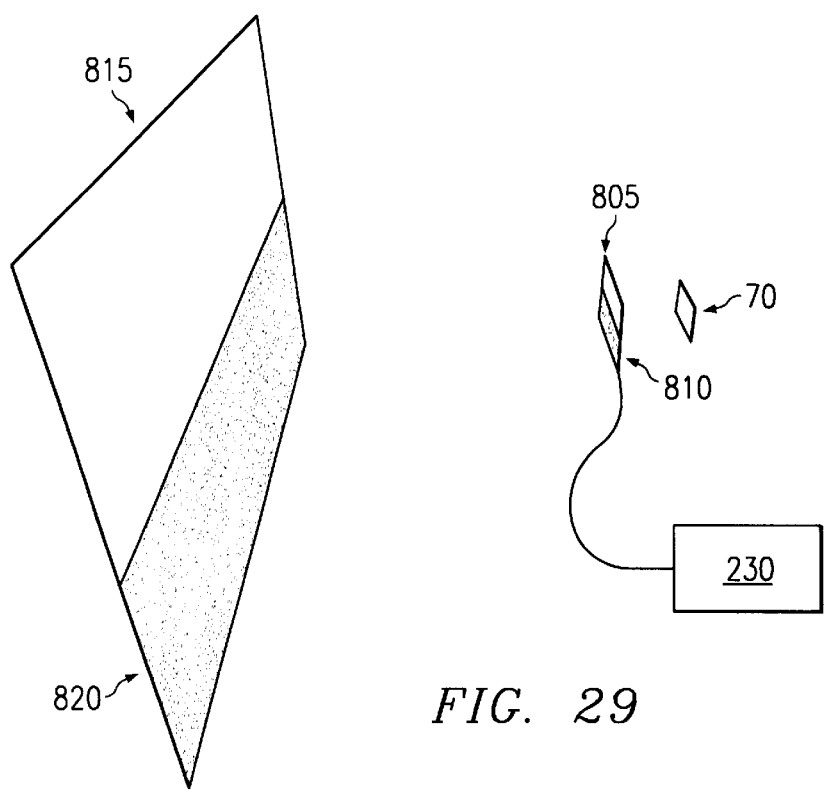
FIG. 29 is an illustration of viewing zones for a holographic stereogram that displays different images when viewed from different viewing zones.
Figure 30:
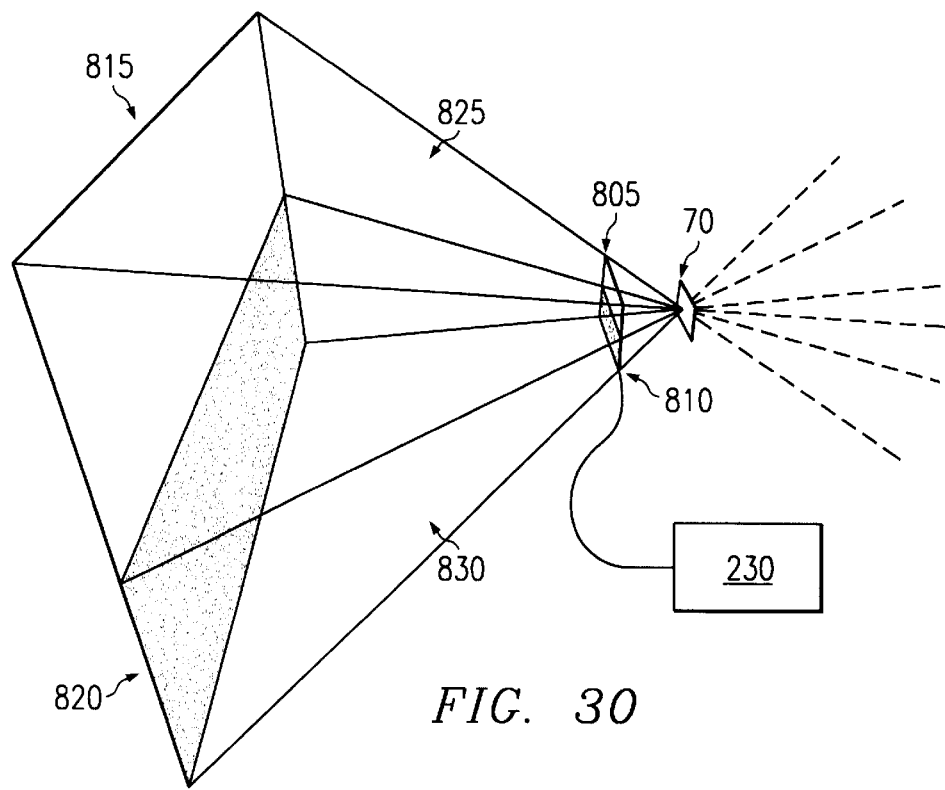
FIG. 30 is an illustration of rays projecting from the perimeter of viewing zones.
Figure 31:
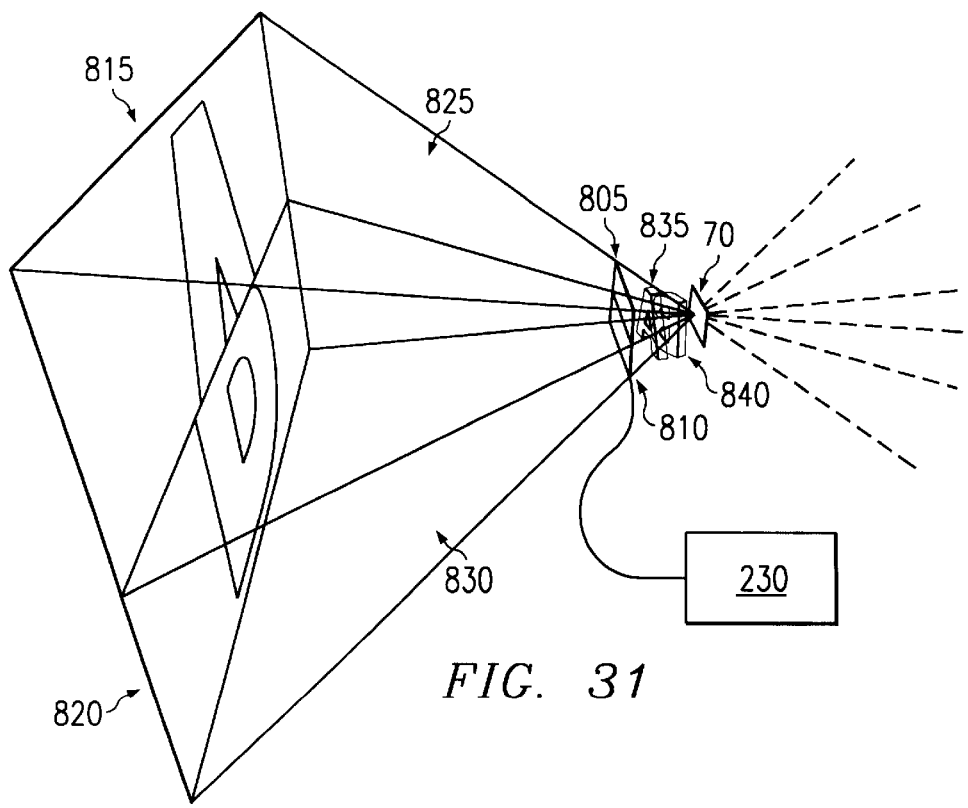
FIG. 31 is an illustration of viewing zone mask volumes.

1) Select the size and shape of a holographic stereogram, and the size and shape of its elemental holograms.
2) Select the desired effect. One example of an effect is changing the orientation of an object or a scene (e.g., its position or rotation) when a viewer moves. Another example of an effect is changing the shape or color of an object or a scene when a viewer moves.
3) Select the reference illumination geometry for the final holographic stereogram.
4) Select the shape(s), size(s), and location(s) of the viewing zone or zones with respect to the holographic recording material. In the plane of the viewing zone, a viewer would see a sharper transition between the different objects or scenes depicted by the holographic stereogram than a viewer not in the plane of the viewing zones. Thus, it may be desirable to select the location of the viewing zones to be at a distance from the holographic recording material where most viewers would be located.
5) Select the objects or scenes or the attributes of the objects or scenes to be displayed by the holographic stereogram.
6) Select the location and placement with respect to the holographic recording material of the holographic images of the objects that will be displayed by the holographic stereogram to be created (i.e. whether the image will be located in front of, in back of, or straddle the holographic recording material).
7) Using a computer 230, generate computer models and model attributes for each viewing zone using traditional computer graphic techniques and programs of the objects or scenes. For instance, generate a computer model of an object 'A' 835 which can only be seen from one viewing zone 805, and generate a computer model of an object 'B' 840 which can only be seen from another viewing zone 810.
8) Set up the hologram printer. For instance, put holographic recording material 70 (shown in FIG. 7) into a material holder 300 (shown in FIG. 7), calibrate and initialize beam shutters 225 (shown in FIG. 7), motor controllers 305, 455 the SLM 90 (shown in FIG. 7), the beam-steering system 400 (shown in FIG. 7), and initialize the computer graphics program, and the computer 230 (shown in FIG. 7).
9) Using a computer 230, for each elemental hologram 110 in a holographic stereogram that may be a one-step, full-parallax, holographic stereogram:
   A) Project lines from the perimeter of the elemental hologram 110 through the perimeter of each of the view zones 805 and 810. Since in a typical printer, a SLM is usually centered in front of an elemental hologram when the elemental hologram is exposed, the virtual image of the SLM that an elemental hologram would see through a voxel-control lens is also usually centered in front of the elemental hologram, as shown in FIG. 29. As depicted in FIG. 30, the projected lines intersect a virtual two-dimensional image 505 (shown in FIG. 10(*b*)) of a SLM image. The elemental hologram will only see the portion of the virtual image 505 of the SLM, such as 815 or 820, bounded by the projecting lines. As shown in FIG. 30, the projected lines define mask volumes 825, 830, which may differ from one elemental hologram to another for a given viewing zone.
   B) For a desired viewing zone mask volume, such as 825, for an elemental hologram 110, using traditional rendering techniques, such as but not limited to, ray-tracing or scan-line conversion, render the portion of the appropriate computer model of an object or scene 835 (shown in FIG. 30) enclosed by the projected mask volume 825 to create a complete two-dimensional image of a projection on the portion of the virtual image 505 of the SLM of the computer graphic models of the objects or scenes 835 or 840 from the perspective of an elemental hologram. For instance, if a person were to look at a particular elemental hologram from within a mask volume 825, only the 'A' object 835 is seen. From mask volume 825, the 'B' object 840 is not viewable. Thus, to a viewer in mask volume 825, the bottom of the virtual image of the SLM is not visible. Similarly, if a person were to look at the particular elemental hologram from within a mask volume 830, only the 'B' object 840 is seen. From mask volume 830, the 'A' object 835 is not viewable. Thus, to a viewer in mask volume 830, the top of the virtual image of the SLM is not visible.
   C) When rendering is complete for all the viewing zones 805 and 810 for an elemental hologram, composite the rendered images for the viewing zones.
   D) Display the composite rendered image for the viewing zones 805 and 810 on the SLM 70 and allow light to pass through the beam shutters 225 for the proper time period to expose the elemental hologram.
   E) Translate the material holder such that another elemental hologram can be exposed.
   F) Repeat steps A through E until all the elemental holograms have been exposed.

In an alternative embodiment, rendering for multiple elemental holograms may be completed before exposing any of the elemental holograms on a holographic recording material.

In an alternative embodiment, the same method applied for creating holographic stereograms with changing views may be used to create a holographic optical element (HOE). For instance, if it is desirable to create a HOE that acts like a lens to a converge diverging white light to a point, then by using the same viewing zone method as described, but determining a view point located at where the light should be focused, rather than a view zone, a HOE may be created. Alternatively, such a HOE can be created by determining a white computer-graphic object with the exact size, shape, and position of a given voxel, and printing a holographic stereogram of such an object.

In one embodiment, the same computer 230 may be programmed to control the motors controlling the beam shutters, the motor controllers for the beam-steering mirror system, the motor controllers for the translation systems, conducts the computer graphics creation and rendering, and controls the display of the SLM. In an alternative embodiment, the same computer may also conduct the computations necessary for animation. The computer 230 may be connected to the beam shutters, the motor controllers for the beam-steering mirror system, and the SLM, through cables connected at both ends to serial or parallel communication ports. One end of the cables may be connected to the communication ports of the computer and the other ends of the cables may be connected to the devices controlled by the computer. In other embodiments, multiple computers 230 may be used.

Figure 32:
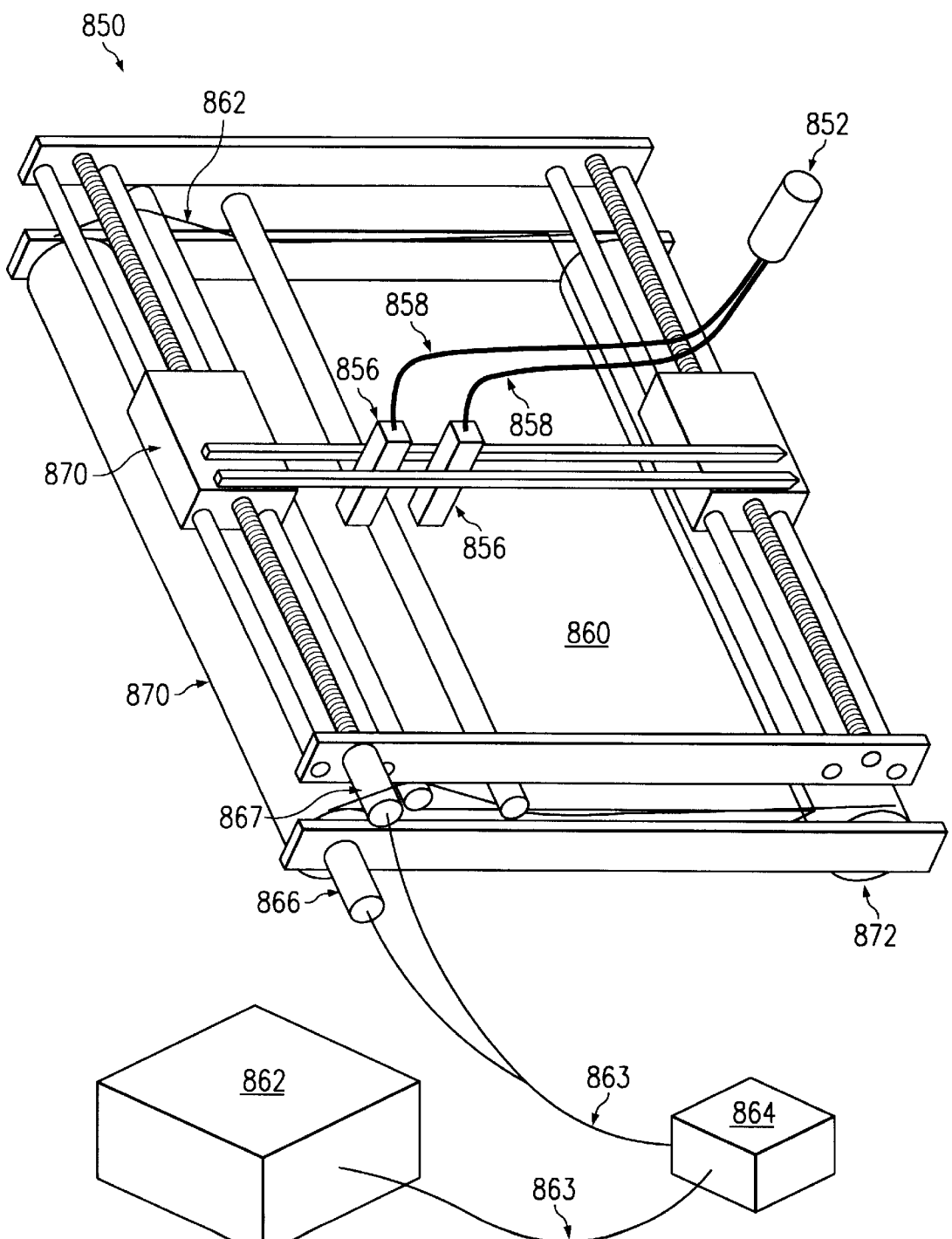
FIG. 32 is an illustration of one embodiment of a replication system using steerable beams.

FIG. 32 is an illustration of one embodiment of a replication system, indicated generally at 850, using steerable beams. A light source 852 provides a beam to replication system 850. Light source 852 can comprise, for example, a laser as discussed with respect to label 1 in earlier FIGS. Replication system 850 includes at least one beam steering unit 856. The embodiment of FIG. 32 includes two beam steering units 856. Beam steering units 856 can comprise, for example, reference beam-steering systems 400 as discussed with respect to earlier FIGs.

A surface 860 can receive a hologram that is to be replicated (also referred to as the master hologram). Surface 860 can comprise glass, or other suitable material. Beam steering units 856 are coupled to a mount 868 such that beam steering units 856 are proximate surface 860. Holographic recording material 862, for example film, can be positioned on the surface 860 opposite from the master hologram. In general, these elements form an assembly that can position the master hologram in proximity to holographic recording material 862 for replicating an image to holographic recording material 862. Of course, it should be understood that the embodiment of FIG. 32 is one example of such an assembly and that the assembly could be implemented in other ways.

The embodiment of FIG. 32 further includes a mechanism for advancing holographic recording material 862. One example of such a mechanism is described by Tipton, D.F., "New Hologram Replicator for Volume Holograms and Holographic Optical Elements," PROC. SOC. PHOTO-OPT. INSTRUM. ENG. (SPIE), 3294–21, Jan. 25–30, 1998, p. 16, and manufactured by DUPONT HOLOGRAPHIC MATERIALS, the disclosure of which is incorporated herein by reference. In the embodiment of FIG. 32, a film supply roll 872 and a film take up roll 870 are coupled along either side of surface 860. Motor 866 is coupled to film supply roll 872. A motor controller 864 is coupled to motor 866 and computer 862 via serial communications lines 863. Computer 862 can further couple to beam steering units 856.

In operation, light source 852 provides a coherent light beam. The beam is directed to beam steering units 856. For example, in the embodiment of FIG. 32, the beam is carried by fiber optic cable 858. Alternatively, a system of mirrors, as discussed with respect to earlier FIGS, can direct the beam to beam steering units 856.

Beam steering units 856 direct the beam toward surface 860, the master hologram, and holographic recording material 862. Beam steering units 856 are operable to direct the beam at component portions of the hologram. Additionally, beam steering units 856 can independently vary the angle of incidence with which the beam strikes each component portion of the hologram.

As the beam is directed toward surface 860 and the master hologram, portions of the beam reflect from the master hologram. The reflected portion of the beam interferes with the beam from beam steering system units 856. The interference pattern formed by the intersection of the reflected portion of the beam and the original portion of the beam are recorded on the film to create the replicated hologram.

Holographic recording material 862 can be advanced via film take up roll 870 and film supply roll 872. For example, motor 866 can roll film take up roll 870 such that the film supply roll 872 supplies film. In the embodiment of FIG. 32, such a mechanism operates to move film 862 in a first direction with respect to surface 860. Further in operation, mount 868 is operable to translate beam steering units 856 in a second direction and substantially parallel to surface 860. For example, computer 862 can direct motor controller 864 which in turn directs motor 867, which moves mount 868. In such a way replication system 850 can direct beam steering units 856 to cover the entire surface of film 862, surface 860, and master hologram.

Computer 862 can direct beam steering units 856 to vary the angle of the beam as needed. For example, if a point source illumination will be used to reconstruct the replicated image, computer 862 can compute the angle at which each component portion of the hologram of the replicated image will be illuminated by the point source. In turn, computer 862 can then direct beam steering units 856 to direct the beam at each component portion of the hologram with the appropriate angle of incidence. In such a manner, replication system 850 can replicate a master hologram by exposing each elemental hologram to an appropriate beam angle.

In one embodiment, for every component portion on the hologram surface, the angle of incidence of the replication system's beam should approximate the angle of incidence of the original hologram's illumination source in order to replicate a hologram that will reconstruct properly. Traditional display hologram illumination sources are point light sources. Computer 862 can calculate the component portion incident beam angle for eventual point light source illumination. For example, a Cartesian coordinate system can be established with the origin at the center of the component portion of interest. Next, the point light source's position coordinates X, Y, and Z can be determined. The beam angle in the X-Z plane for that component portion would then be the inverse tangent of Z divided by X, and the beam angle in the Y-Z plane for that component portion would be the inverse tangent of Z divided by Y. In addition, there may be non-traditional holograms or holographic optical elements to be replicated with interleaved component portions with various point light source position coordinates. One potential use for such non-traditional holograms, for example, would be to produce difficult-to-counterfeit authentication seal holograms.

Figure 33:
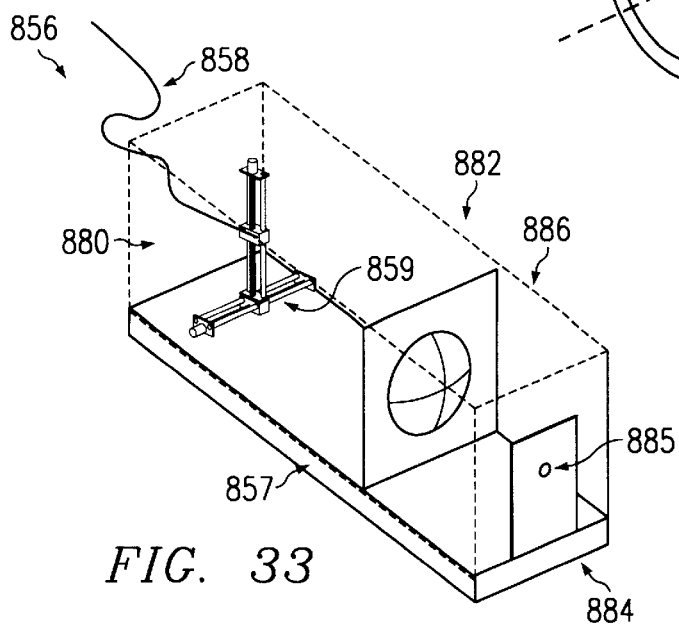
FIG. 33 is an illustration of one embodiment of a beam steering unit
Figure 28:
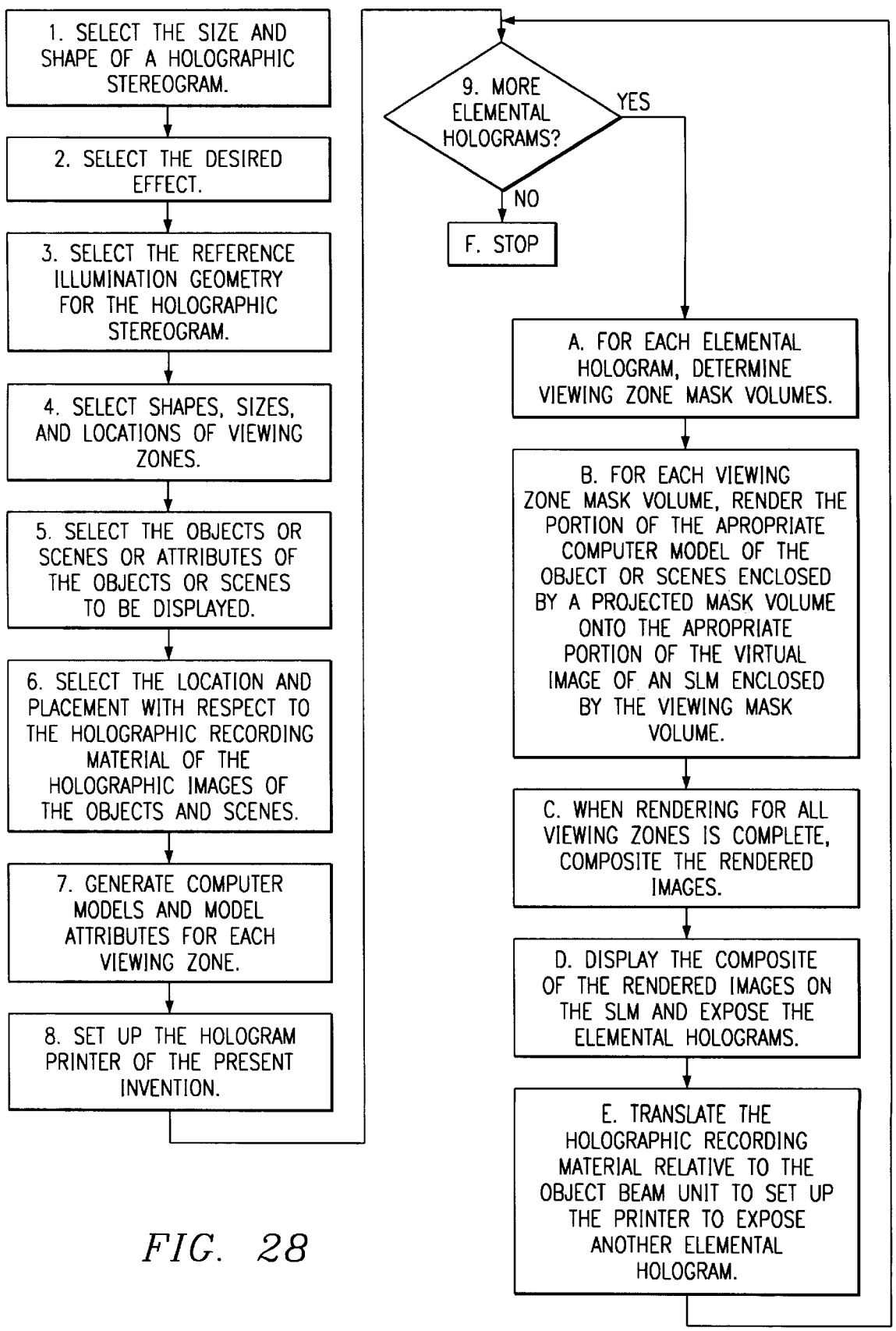
FIG. 28 is a flow chart illustrating the steps for creating an animated, one-step, full-parallax holographic stereogram.

FIG. 33 is an illustration of one embodiment of a beam steering unit 856. In this embodiment, beam steering unit 856 includes a base platform 857. A translation system 880 and lens 882 are coupled to base platform 857. The embodiment of FIG. 33 further comprises an exposure mask plate 884 which includes aperture 885. An optional enclosure 886 can enclose beam steering unit 856. A fiber optic cable 858 having a tip 859 couples to translation system 880. The beam steering unit 856 of FIG. 33 can comprise a system substantially similar to reference beam-steering system 400 of FIG. 18. For example, translation system 880 could comprise translation system 600 of FIG. 18.

In operation, the beam is directed to beam steering unit 856 through fiber optic cable 858. Translation system 880 moves tip 859 of fiber optic cable 858 such that the beam is directed towards different points of lens 882. Translation system 800 could be under the direction, for example, of a computer. Tip 859 can be placed and moved around within the focal plane of lens 882 Lens 882 then directs the beam towards aperture 885 of exposure mask plate 884. Lens 882 can comprise, for example, an achromatic scanning lens such as an F-theta lens. An F-theta lens can comprise a lens with built-in barrel distortion such that the position of the focused spot is dependent upon the product of the focal length and the deflection angle. Such a lens can be operable to convert a point source of light moving in a flat plane into a scanning beam. Translation system 880, by directing the beam towards different portions of lens 882, forces the directed beam to strike aperture 885 at different angles. When the beam leaves aperture 885, it is directed towards the film and master hologram to replicate the master, as discussed with respect to FIG. 32.

Figure 34:
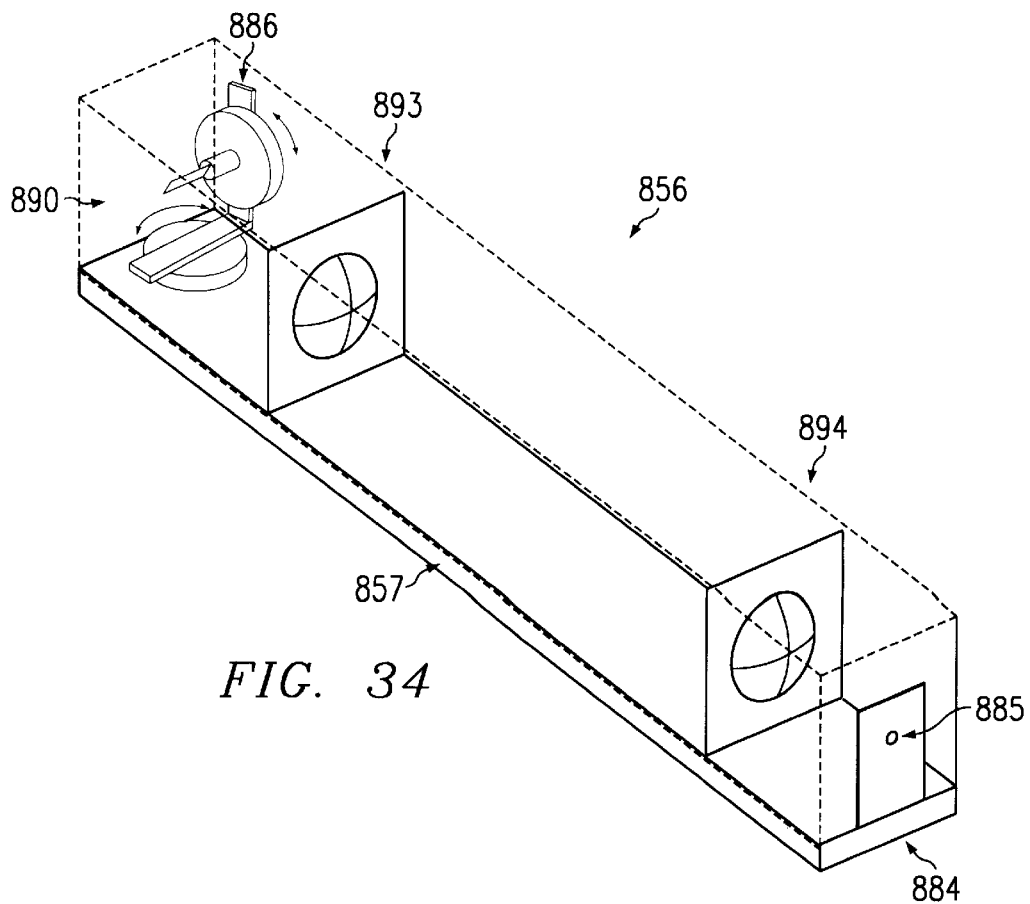
FIG. 34 is an illustration of another embodiment of a beam steering unit.

FIG. 34 is an illustration of another embodiment of beam steering unit 856. Beam steering unit 856 of FIG. 34 can comprise, for example, a system substantially similar to reference beam-steering system 400 of FIG. 14.

Beam steering unit 856 comprises a base platform 857. A first lens 893 and a second lens 894 are coupled to base platform 857. First lens 893 and second lens 894 can comprise, for example, achromatic lenses. Second lens 894 and/or first lens 893 can further comprise F-theta lenses. A beam steering mirror system 890 further couples to base platform 857. Beam steering mirror system 890 can comprise, for example, a system substantially similar to beam steering mirror system 450 of FIG. 15 or FIG. 16. In such an embodiment, the beam is received through air and not through a fiber optic cable as FIG. 33. Exposure mask plate 884 also couples to base platform 857 such that optional aperture 885 receives the directed beam from second lens 894.

In operation, as discussed with respect to FIG. 14, beam steering mirror system 890 is operable to direct the beam at various angles towards first lens 893. Lenses 893 and 894 can be operable to act substantially similar to first beam steering lens 410 and second beam steering lens 405 as discussed with respect to FIG. 14.

After the beam enters beam steering unit 856, beam steering mirror unit 890 directs the beam towards first lens 893. Beam steering mirror unit 890 can be under the direction, for example, of a computer. The beam strikes first lens 893, and first lens 893 directs the beam towards second lens 894. As discussed above, first lens 893 can be coupled to base platform 857 and spaced from bear steering mirror unit 890 at a distance equal to one focal length of first lens 893. The beam then strikes second lens 894, and second lens 894 directs the beam such that the beam passes through a predetermined point at varying incidence angles. Second lens 894 can be spaced from first lens 893 at a distance equal to the sum of the focal lengths of first lens 893 and second lens 894. Exposure mask plate 884 can be coupled to base platform 857 at a distance away from second lens 894 equal to one focal length of second lens 894, such that optional exposure aperture 885 is placed at the predetermined point through which the beam will travel.

The beam then exits beam steering unit through an optional aperture 885. By changing the angle of incidence of the beam with respect to lens 893, the angle at which the beam exits beam steering unit 856 can be varied. As such, the incidence angle with which the beam strikes the hologram to be replicated can be varied.

The present invention allows a hologram to be properly replicated on a component portion level for illumination from a common light source. The beam can be controlled such that holograms with different reference illuminations can be replicated without reconfiguring the replication system, as is currently required with conventional replication systems.

Figure 35:
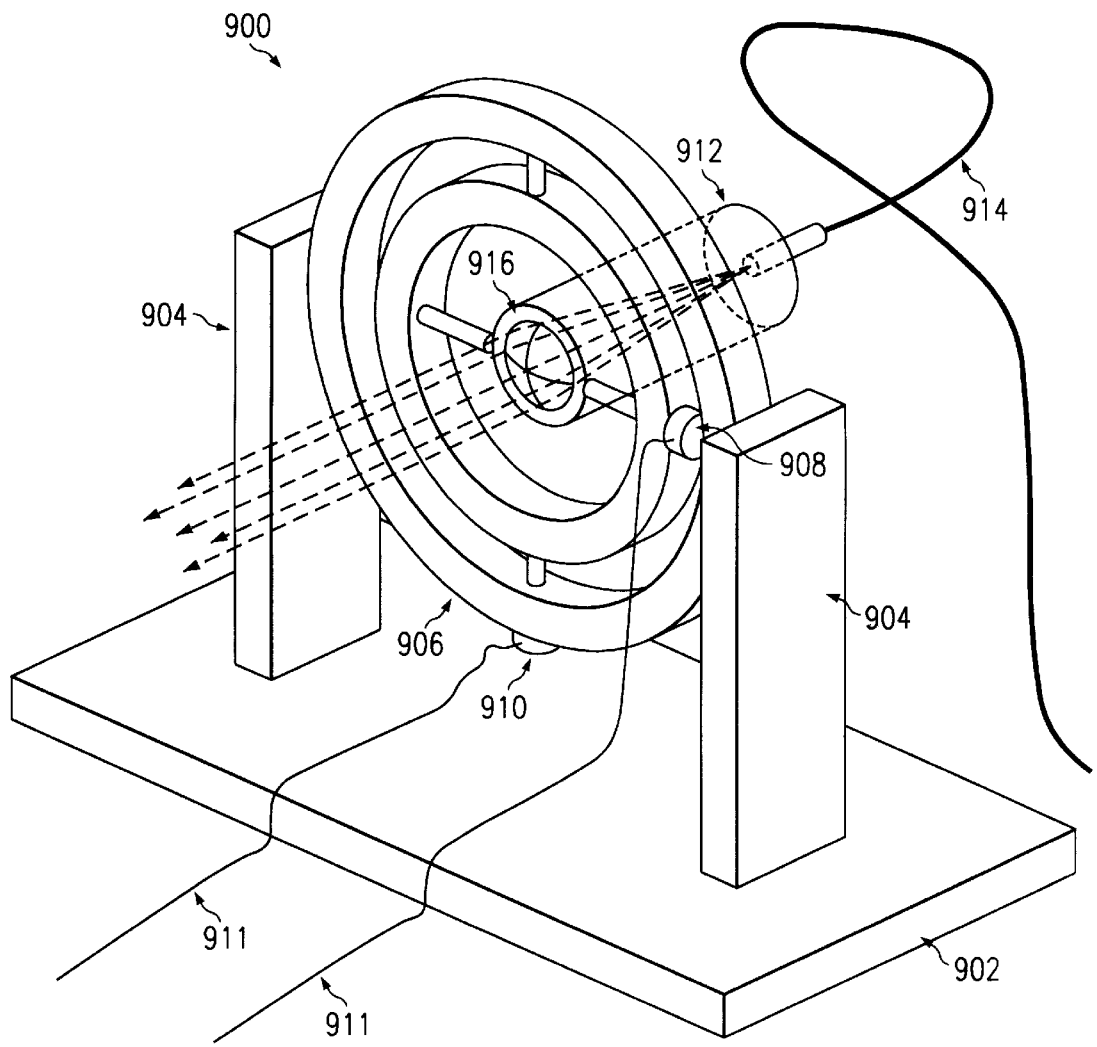
FIG. 35 is an illustration of a further embodiment of a beam steering unit.

FIG. 35 is an illustration of a further embodiment of a beam steering unit 856. In the embodiment of FIG. 35, the beam steering unit, indicated generally at 900, comprises a base 902 and support members 904. A gimbal mount, indicated generally at 906, is coupled to the support members 904, as shown. Gimbal mount 906 comprises an x-axis motor 908 and a y-axis motor 910 that allow control of the orientation of gimbal mount 906 through x-axis and y-axis motor serial control lines 911. In the embodiment of FIG. 35, gimbal mount 906 operates to steer a collimated beam output by the combination of an optical fiber beam collimator 912, which receives a beam from an optical fiber 914, and a lens 916.

In general, beam steering unit 900 comprises a two-orthagonal axis gimbal mount similar to the mirror mount shown in FIG. 16. Instead of a mirror, beam steering unit 900 comprises an optical system which takes an optical fiber tip input (from optical fiber 914) to collimating lens 916 and outputs a collimated beam. Gimbal mount 906 allows the beam to be steered and pointed at a range of controlled angles. This can be useful both for a replication function as well as a printing function. For example, beam steering unit 900 of FIG. 35 could be substituted for the gimbal mirror mount in FIG. 16 or the rotating platform mirror in FIG. 15. It can also function inside a reference beam head assembly like those illustrated in FIGS. 33 and 34.

As above, beam steering unit 900 functions within a printing or replication system where it is translated with respect to the hologram being printed or replicated. In this case, the x-y position of beam steering unit 900 would be determined, for example, by the x-y plane position of the hogel to be printed or replicated and the angle of incidence at the hogel. Thus, for every component portion on a hologram surface, a Cartesian coordinate system can be established with the origin at the center of the component portion. The illumination source angle of incidence is known in both the X-Z plane and Y-Z planes, and the Z coordinate of the beam steering unit's gimbal mount center point is a free parameter set according to convenience. Given this information, the X coordinate of the beam steering unit's gimbal mount center point can be computed by dividing the gimbal center point Z coordinate by the tangent of the angle in the X-Z plane, and the Y coordinate of the beam steering unit's gimbal mount center point can be computed by dividing the gimbal center point Z coordinate by the tangent of the angle in the Y-Z plane.

While the methods and apparatus of this invention have been described in terms of illustrated embodiments, it will be apparent to those of skill in the art that variations, such as but not limited to different combination of lens set-ups to create the same effect as the beam steering lenses described herein, may be applied to the methods and apparatus and in the step or in the sequence of steps of the methods described herein without departing from the concept, spirit and scope of the invention. All substitutes and modifications apparent to those skilled in the art are deemed to be within the spirit, scope and concept of the invention as defined by the appended claims.

What is claimed is:

1. An apparatus for replicating a hologram, comprising:
   an assembly operable to position a hologram in proximity to holographic recording material; and
   a beam steering unit operable to direct a beam at component portions of a hologram positioned by the assembly, the beam operable to replicate the component portions onto holographic recording material positioned by the assembly;
   the beam steering unit further operable to enable independently variable angles of incidence at which the beam strikes each component portion.

2. The apparatus of claim 1, wherein the assembly comprises a surface for receiving the hologram.

3. The apparatus of claim 1, wherein the assembly comprises a plate holder for receiving a hologram mounted to a glass plate.

4. The apparatus of claim 1, further comprising a computer coupled to the beam steering unit, the computer operable to control the angle of incidence at which the beam strikes each component portion.

5. The apparatus of claim 1, wherein each component portion of the hologram comprises an elemental hologram.

6. The apparatus of claim 1, further comprising a mount to which the beam steering unit is coupled, the mount operable to translate the beam steering unit in a plane substantially parallel to a hologram positioned by the assembly.

7. The apparatus of claim 1, wherein the assembly comprises an advancing mechanism for moving holographic recording material with respect to a hologram positioned by the assembly.

8. The apparatus of claim 7, wherein the advancing mechanism moves the holographic recording material in a first direction with respect to the hologram.

9. The apparatus of claim 8, further comprising a mount to which the beam steering unit is coupled, wherein the mount is operable to translate the beam steering unit in a plane substantially parallel to the hologram in a second direction, the second direction substantially perpendicular to the first direction.

10. The apparatus of claim 1, further comprising a fiber optic cable having a tip for delivering the beam to the beam steering unit.

11. The apparatus of claim 10, wherein the beam steering unit comprises:
a base platform;
a translation system coupled to the base platform, the translation system operable to receive the tip of the fiber optic cable, the translation system further operable to move the tip of the fiber optic cable; and
a lens for receiving the beam from the tip of the fiber optic cable, the lens operable to direct the beam such that the beam passes through a predetermined point at varying angles.

12. The apparatus of claim 11, further comprising an exposure plate having an aperture coupled to the base platform, the aperture positioned at the predetermined point.

13. The apparatus of claim 11, wherein the lens comprises an F-theta lens.

14. The apparatus of claim 11, wherein the translation system is operable to move the tip of the fiber optic cable within the focal plane of the lens.

15. The apparatus of claim 11, wherein the lens comprises an achromatic lens.

16. The apparatus of claim 11, wherein the lens comprises an achromatic F-theta lens, and the translation system is operable to move the tip of the fiber optic cable within the input plane of the lens.

17. The apparatus of claim 16, wherein the hologram is spaced apart from the lens at an exit pupil of the lens.

18. The apparatus of claim 1, wherein the beam steering unit comprises a gimbal mounted beam collimator.

19. The apparatus of claim 1, wherein the beam steering unit comprises:
a base platform;
a beam steering mirror system coupled to the base platform, the beam steering mirror system operable to receive a beam and direct the beam at various angles;
a first lens coupled to the base platform, the first lens operable to receive the beam from the beam steering mirror system and direct the beam in a first direction towards a second lens; and
the second lens coupled to the base platform distant from the first lens in the first direction, the second lens operable to receive the beam from the first lens and direct the beam such that the beam passes through a predetermined point at varying angles.

20. The apparatus of claim 19, further comprising an exposure plate having an aperture coupled to the base platform, the aperture positioned at the predetermined point.

21. The apparatus of claim 19, wherein the first lens comprises an F-theta lens.

22. The apparatus of claim 19, wherein the second lens comprises an F-theta lens.

23. The apparatus of claim 19, wherein the first lens and the second lens comprise achromatic lenses.

24. The apparatus of claim 19, wherein the first lens and the second lens comprise achromatic F-theta lenses.

25. The apparatus of claim 23, wherein the first lens is spaced apart from the beam steering mirror system at a first distance approximately equal to one focal length of the first lens.

26. The apparatus of claim 23, wherein the second lens is spaced apart from the first lens at a second distance approximately equal to a sum of the first distance plus one focal length of the second lens.

27. The apparatus of claim 26, wherein the hologram is spaced apart from the second lens at a third distance approximately equal to one focal length of the second lens.

28. An apparatus for replicating a hologram, comprising:
an assembly operable to position a hologram in proximity to holographic recording material; and
a beam steering unit formed to receive a fiber optic cable having a tip for delivering a beam, the beam steering unit comprising:
a base platform;
a translation system coupled to the base platform, the translation system operable to receive the tip of the fiber optic cable, the translation system further operable to move the tip of the fiber optic cable; and
a lens for receiving the beam from the tip of the fiber optic cable, the lens operable to direct the beam such that the beam passes through a predetermined point at varying angles;
the beam steering unit operable to direct the beam at component portions of a hologram positioned by the assembly to replicate the component portions onto holographic recording material positioned by the assembly;
the beam steering unit further operable to independently vary an angle of incidence at which the beam strikes each component portion.

29. The apparatus of claim 28, further comprising a computer coupled to the beam steering unit, the computer operable to control the angle of incidence at which the beam strikes each component portion.

30. The apparatus of claim 28, wherein each component portion of the hologram comprises an elemental hologram.

31. The apparatus of claim 28, further comprising a mount to which the beam steering unit is coupled, the mount operable to translate the beam steering unit in a plane substantially parallel to a hologram positioned by the assembly.

32. The apparatus of claim 28, wherein the assembly comprises an advancing mechanism for moving holographic recording material with respect to a hologram positioned by the assembly.

33. The apparatus of claim 32, wherein the advancing mechanism moves the holographic recording material in a first direction with respect to the hologram.

34. The apparatus of claim 33, further comprising a mount to which the beam steering unit is coupled, wherein the mount is operable to translate the beam steering unit substantially parallel to the hologram in a second direction, the second direction substantially perpendicular to the first direction.

35. The apparatus of claim 28, further comprising an exposure plate having an aperture coupled to the base platform, the aperture positioned at the predetermined point.

36. The apparatus of claim 28, wherein the lens comprises an F-theta lens.

37. The apparatus of claim 28, wherein the translation system is operable to move the tip of the fiber optic cable within the focal plane of the lens.

38. The apparatus of claim 28, wherein the lens comprises an achromatic lens.

39. The apparatus of claim 28 wherein the hologram is spaced apart from the lens at a distance approximately equal to one focal length of the lens.

40. An apparatus for replicating a hologram, comprising:
an assembly operable to position a hologram in proximity to holographic recording material; and
a beam steering unit comprising:
  a base platform;
  a beam steering mirror system coupled to the base platform, the beam steering mirror system operable to receive a beam and direct the beam at various angles;
  a first lens coupled to the base platform, the first lens operable to receive the beam from the beam steering mirror system and direct the beam in a first direction towards a second lens; and
  the second lens coupled to the base platform distant from the first lens in the first direction, the second lens operable to receive the beam from the first lens and direct the beam such that the beam passes through a predetermined point at varying angles;
the beam steering unit operable to direct the beam at component portions of a hologram positioned by the assembly to replicate the component portions onto holographic recording material positioned by the assembly;
the beam steering unit further operable to independently vary an angle of incidence at which the beam strikes each component portion.

41. The apparatus of claim 40, further comprising a computer coupled to the beam steering unit, the computer operable to control the angle of incidence at which the beam strikes each component portion.

42. The apparatus of claim 40, wherein each component portion of the hologram comprises an elemental hologram.

43. The apparatus of claim 40, further comprising a mount to which the beam steering unit is coupled, the mount operable to translate the beam steering unit in a plane substantially parallel to a hologram positioned by the assembly.

44. The apparatus of claim 40, wherein the assembly comprises an advancing mechanism for moving the holographic recording material with respect to the hologram.

45. The apparatus of claim 44, wherein the advancing mechanism moves the holographic recording material in a first direction with respect to the hologram.

46. The apparatus of claim 45, further comprising a mount to which the beam steering unit is coupled, wherein the mount is operable to translate the beam steering unit with respect to the hologram in a second direction, the second direction substantially perpendicular to the first direction.

47. The apparatus of claim 40, further comprising an exposure plate having an aperture coupled to the base platform, the aperture positioned at the predetermined point.

48. The apparatus of claim 40, wherein the second lens comprises an F-theta lens.

49. The apparatus of claim 40, wherein the first lens and the second lens comprise achromatic lenses.

50. The apparatus of claim 40, wherein the first lens and the second lens comprise achromatic F-theta lenses.

51. The apparatus of claim 40, wherein the first lens is spaced apart from the beam steering mirror system at a first distance approximately equal to one focal length of the first lens.

52. The apparatus of claim 51, wherein the second lens is spaced apart from the first lens at a second distance approximately equal to a sum of the first distance plus one focal length of the second lens.

53. The apparatus of claim 52, wherein the hologram is spaced apart from the second lens at a third distance approximately equal to one focal length of the second lens.

54. A method for replicating a hologram, comprising:
positioning holographic recording material proximate a hologram, the holographic recording material for recording a replicated image of the hologram; and
directing a beam at component portions of the hologram to replicate the component portions on the holographic recording material;
wherein an angle of incidence at which the beam strikes each component portion is independently variable.

55. The method of claim 54, further comprising moving the holographic material with respect to the hologram.

56. The method of claim 54, wherein the directing step comprises using a beam steering unit.

57. The method of claim 56, further comprising translating the beam steering unit in a plane substantially parallel to the hologram.

58. The method of claim 57, wherein translating the beam steering unit comprises translating the beam steering unit in a first direction with respect to the hologram.

59. The method of claim 58, further comprising moving the holographic recording material in a second direction with respect to the hologram, the second direction substantially perpendicular to the first direction.

* * * * *